(12) United States Patent
Spencer

(10) Patent No.: US 10,732,917 B2
(45) Date of Patent: *Aug. 4, 2020

(54) SYSTEMS, METHODS, AND APPARATUSES FOR IMPLEMENTING FRAME AGGREGATION WITH SCREEN SHARING

(71) Applicant: salesforce.com, inc., San Francisco, CA (US)

(72) Inventor: Barry L. Spencer, Falmouth, ME (US)

(73) Assignee: salesforce.com, inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/037,896

(22) Filed: Jul. 17, 2018

(65) Prior Publication Data
US 2019/0034149 A1    Jan. 31, 2019

Related U.S. Application Data

(60) Continuation of application No. 14/937,687, filed on Nov. 10, 2015, now Pat. No. 10,025,547, which is a (Continued)

(51) Int. Cl.
*G06F 15/16*    (2006.01)
*G06F 3/14*     (2006.01)
(Continued)

(52) U.S. Cl.
CPC ............ *G06F 3/1423* (2013.01); *H04L 47/50* (2013.01); *H04L 65/403* (2013.01); *H04L 65/4015* (2013.01); *H04L 65/60* (2013.01)

(58) Field of Classification Search
CPC ... H04L 65/403; H04L 65/60; H04L 65/4015; H04L 12/12; H04L 67/125
(Continued)

(56) References Cited

U.S. PATENT DOCUMENTS 5,577,188 A    11/1996  Zhu
5,608,872 A     3/1997  Schwartz et al.
(Continued)

OTHER PUBLICATIONS

Final Office Action for U.S. Appl. No. 13/840,282, dated Jan. 21, 2016, 23 pages.
(Continued)

*Primary Examiner* — Wing F Chan
*Assistant Examiner* — Andrew Woo
(74) *Attorney, Agent, or Firm* — Elliot, Ostrander & Preston, P.C.

(57) ABSTRACT

In accordance with disclosed embodiments, there are provided methods, systems, and apparatuses for implementing frame aggregation with screen sharing including, for example, means for receiving, at a server, a stream of delta frames from a publishing client as part of a screen sharing session with one or more viewing clients; establishing a FIFO buffer for each of the respective one or more viewing clients on 1:1 basis; queuing a copy of the stream of delta frames into each of the FIFO buffers corresponding to the one or more viewing clients, wherein the stream of delta frames are transmitted from the respective FIFO buffers to the corresponding one or more client viewers; monitoring each of the respective FIFO buffers for each of the one or more viewing clients to determine if two or more delta frames are concurrently queued in any single one of the respective FIFO buffers at any given time; aggregating the two or more delta frames into a single aggregated delta frame; re-queuing the aggregated delta frame; and transmitting the aggregated delta frame to the respective viewing client. Other related embodiments are disclosed.

21 Claims, 15 Drawing Sheets

Related U.S. Application Data division of application No. 13/840,204, filed on Mar. 15, 2013, now Pat. No. 9,185,149.

(60) Provisional application No. 61/663,692, filed on Jun. 25, 2012, provisional application No. 61/663,689, filed on Jun. 25, 2012.

(51) Int. Cl.
*H04L 29/06* (2006.01)
*H04L 12/863* (2013.01)

(58) Field of Classification Search
USPC .......................................................... 709/204
See application file for complete search history.

(56) References Cited

U.S. PATENT DOCUMENTS

| | | |
|---|---|---|
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 6,092,083 A | 7/2000 | Brodersen et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec |
| 6,324,693 B1 | 11/2001 | Brodersen et al. |
| 6,336,137 B1 | 1/2002 | Lee et al. |
| D454,139 S | 3/2002 | Feldcamp |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,484,206 B2 | 11/2002 | Crump et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker et al. |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,145,887 B1 | 12/2006 | Akgun et al. |
| 7,340,411 B2 | 3/2008 | Cook |
| 7,571,181 B2 | 8/2009 | Hodes |
| 7,620,655 B2 | 11/2009 | Larsson et al. |
| 7,769,015 B2 | 8/2010 | Huang et al. |
| 7,809,851 B2 | 10/2010 | Klemets |
| 2001/0044791 A1 | 11/2001 | Richter et al. |
| 2002/0022986 A1 | 2/2002 | Coker et al. |
| 2002/0029161 A1 | 3/2002 | Brodersen et al. |
| 2002/0029376 A1 | 3/2002 | Ambrose et al. |
| 2002/0035577 A1 | 3/2002 | Brodersen et al. |
| 2002/0042264 A1 | 4/2002 | Kim |
| 2002/0042843 A1 | 4/2002 | Diec |
| 2002/0072951 A1 | 6/2002 | Lee et al. |
| 2002/0082892 A1 | 6/2002 | Raffel et al. |
| 2002/0093982 A1 | 7/2002 | Joy et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0152102 A1 | 10/2002 | Brodersen et al. |
| 2002/0152293 A1 | 10/2002 | Hahn et al. |
| 2002/0161734 A1 | 10/2002 | Stauber et al. |
| 2002/0162090 A1 | 10/2002 | Parnell et al. |
| 2002/0165742 A1 | 11/2002 | Robins |
| 2003/0004971 A1 | 1/2003 | Gong et al. |
| 2003/0018705 A1 | 1/2003 | Chen et al. |
| 2003/0018830 A1 | 1/2003 | Chen et al. |
| 2003/0066031 A1 | 4/2003 | Laane |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker |
| 2003/0088545 A1 | 5/2003 | Subramaniam et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec |
| 2003/0189600 A1 | 10/2003 | Gune et al. |
| 2003/0191743 A1 | 10/2003 | Brodersen et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2005/0271140 A1 | 12/2005 | Hanamura et al. |
| 2006/0010392 A1 | 1/2006 | Noel et al. |
| 2007/0123288 A1 | 5/2007 | Hofbauer et al. |
| 2007/0233822 A1 | 10/2007 | Farmer et al. |
| 2008/0089250 A1 | 4/2008 | Jung |
| 2011/0072366 A1 | 3/2011 | Spencer et al. |
| 2011/0196833 A1 | 8/2011 | Drobychev et al. |
| 2011/0276699 A1 | 11/2011 | Pedersen |
| 2012/0062688 A1 | 3/2012 | Shen et al. |

(56) References Cited

U.S. PATENT DOCUMENTS

2012/0166952 A1     6/2012   Alexandrov et al.
2013/0279877 A1    10/2013   Boak

OTHER PUBLICATIONS

Non-Final Office Action for U.S. Appl. No. 13/648,777, dated May 22, 2015, 10 pages.
Non-Final Office Action for U.S. Appl. No. 13/840,282, dated Apr. 8, 2015, 21 pages.
Non-Final Office Action for U.S. Appl. No. 13/840,347, dated Jan. 16, 2015, 35 pages.
Non-Final Office Action for U.S. Appl. No. 14/937,687, dated Jul. 13, 2017, 22 pages.
Notice of Allowance for U.S. Appl. No. 13/648,777, dated Oct. 13, 2015, 9 pages.
Notice of Allowance for U.S. Appl. No. 13/840,204, dated Aug. 18, 2015, 13 pages.
Notice of Allowance for U.S. Appl. No. 13/840,282, dated Jan. 25, 2017, 7 pages.
Notice of Allowance for U.S. Appl. No. 13/840,347, dated Sep. 22, 2015, 15 pages.
Notice of Allowance for U.S. Appl. No. 14/036,472, dated Jan. 21, 2016, 12 pages.
Notice of Allowance for U.S. Appl. No. 14/937,687, dated Mar. 19, 2018, 27 pages.
Zohar, E, et al, "The Power of Prediction: Cloud Bandwidth and Cost Reduction," Sigcomm, Sep. 2011, http://conferences.sigcomm.org/sigcomm/2011/papers/sigcomm/p86.pdf, 12 pages.

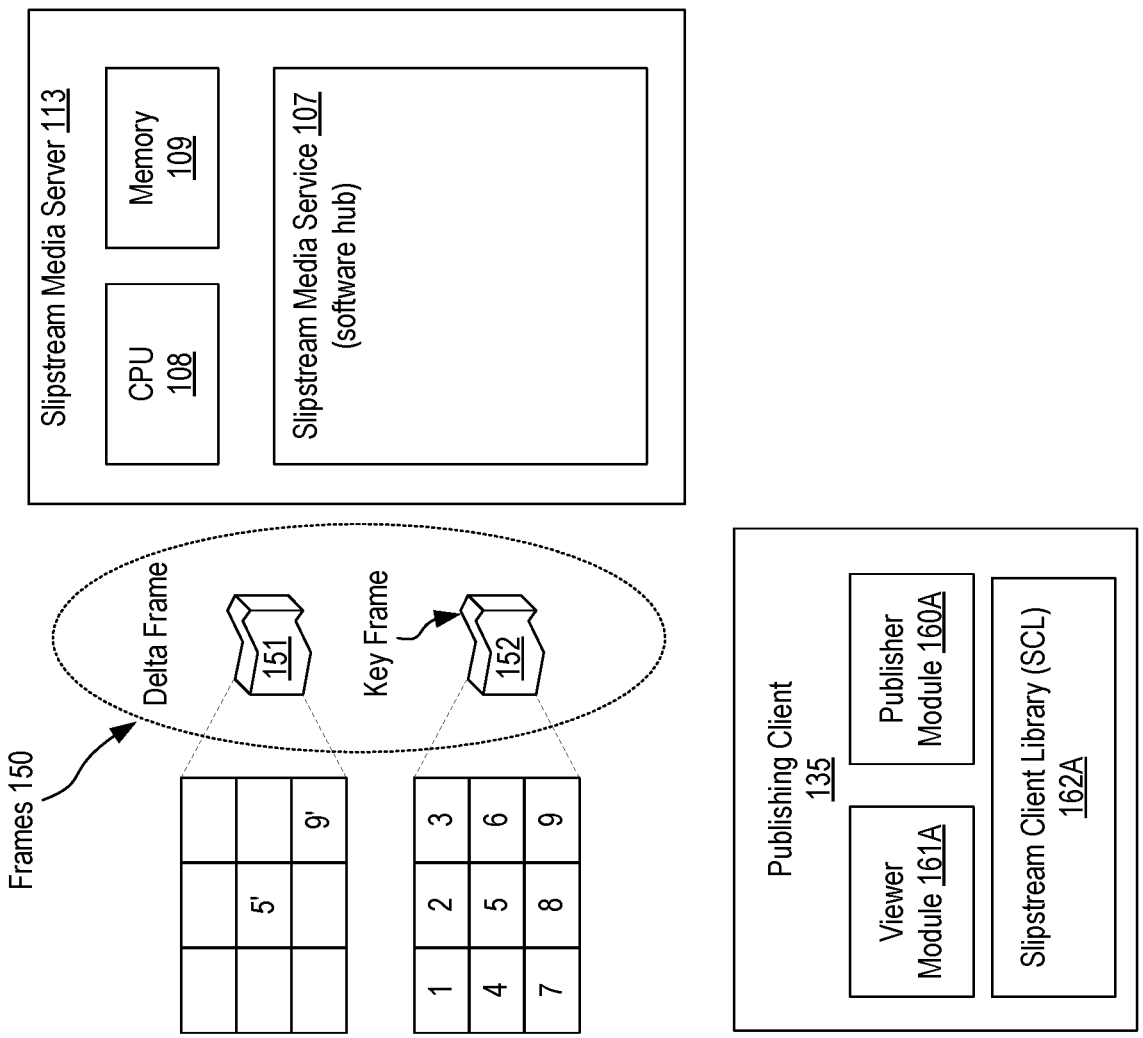

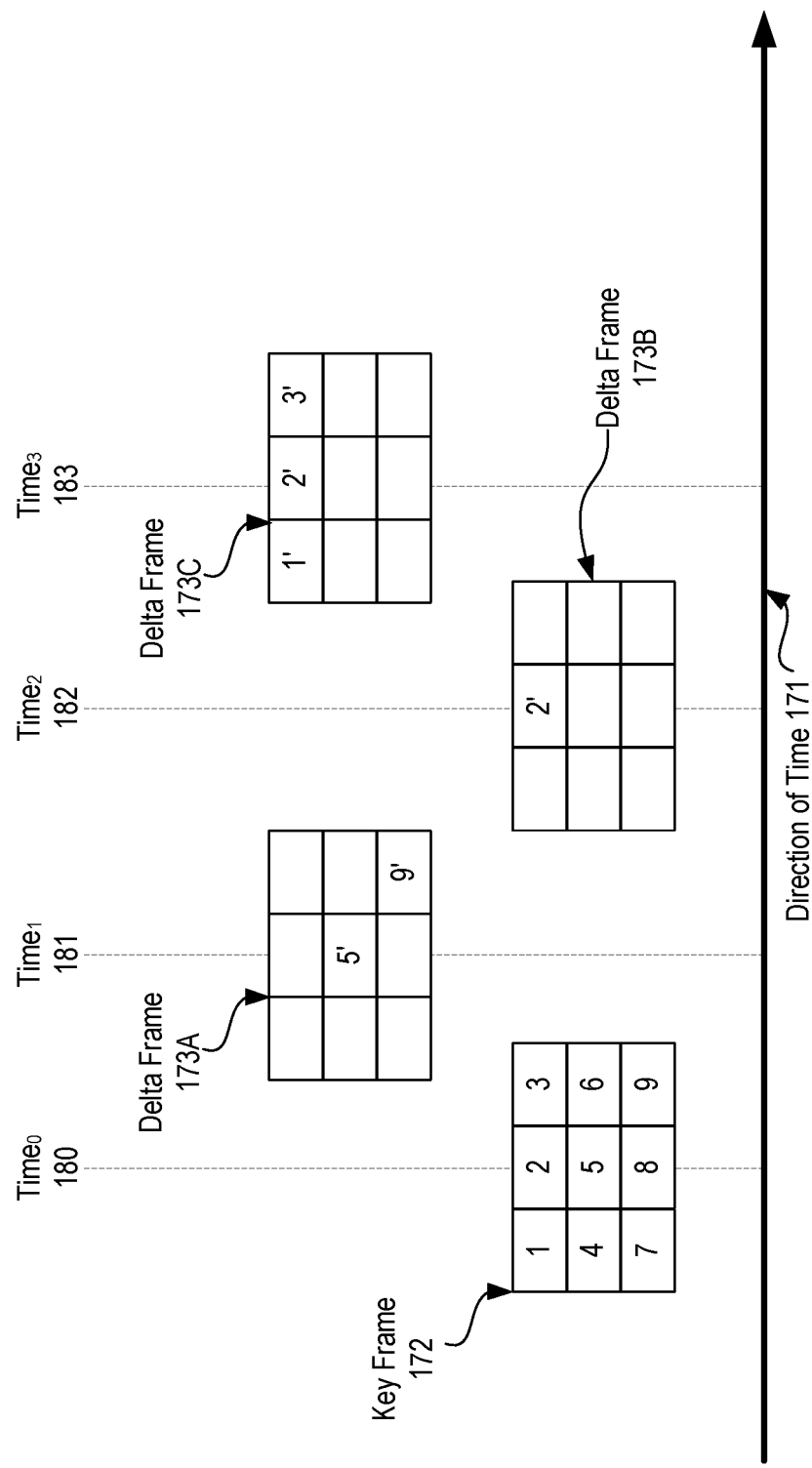

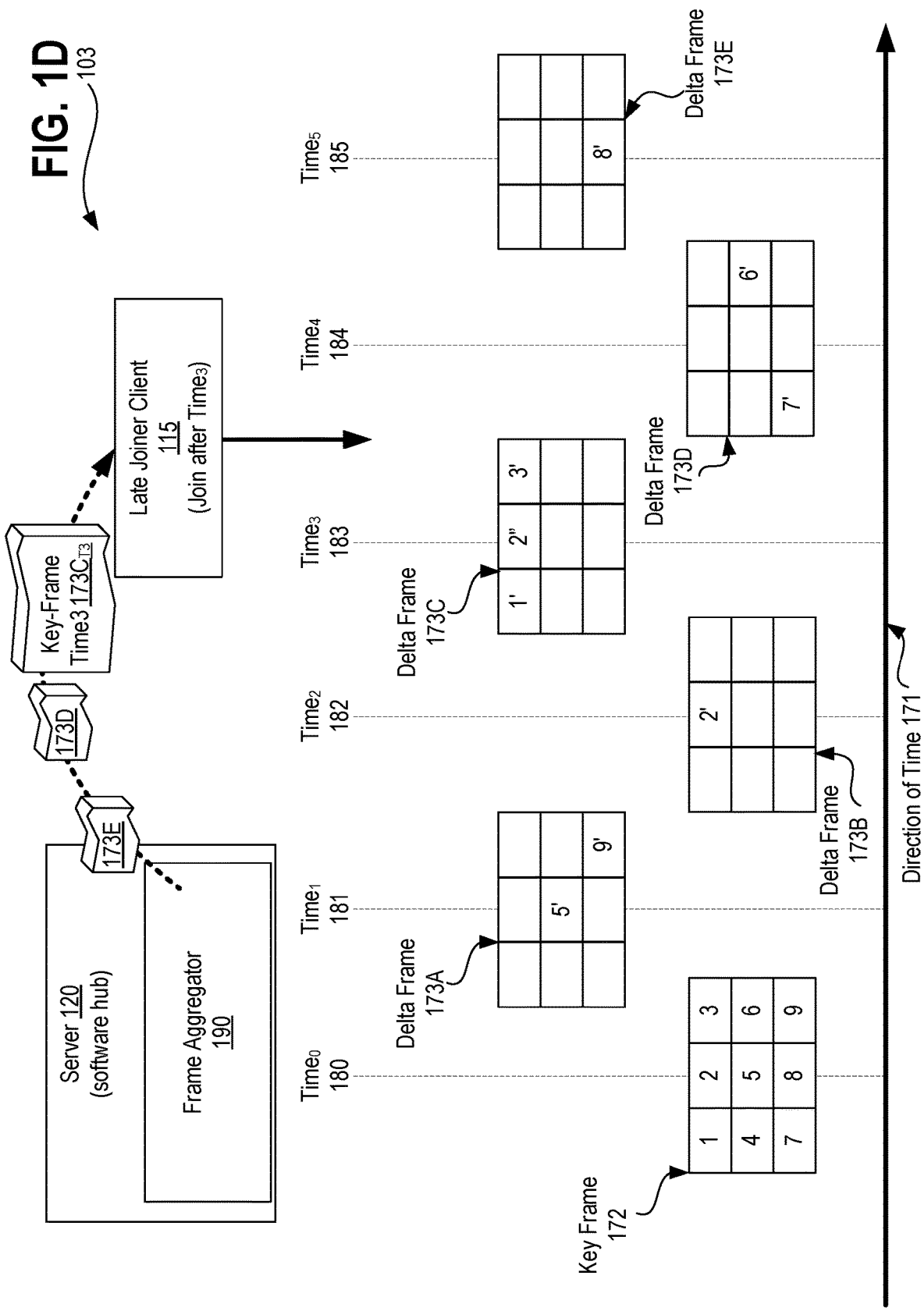

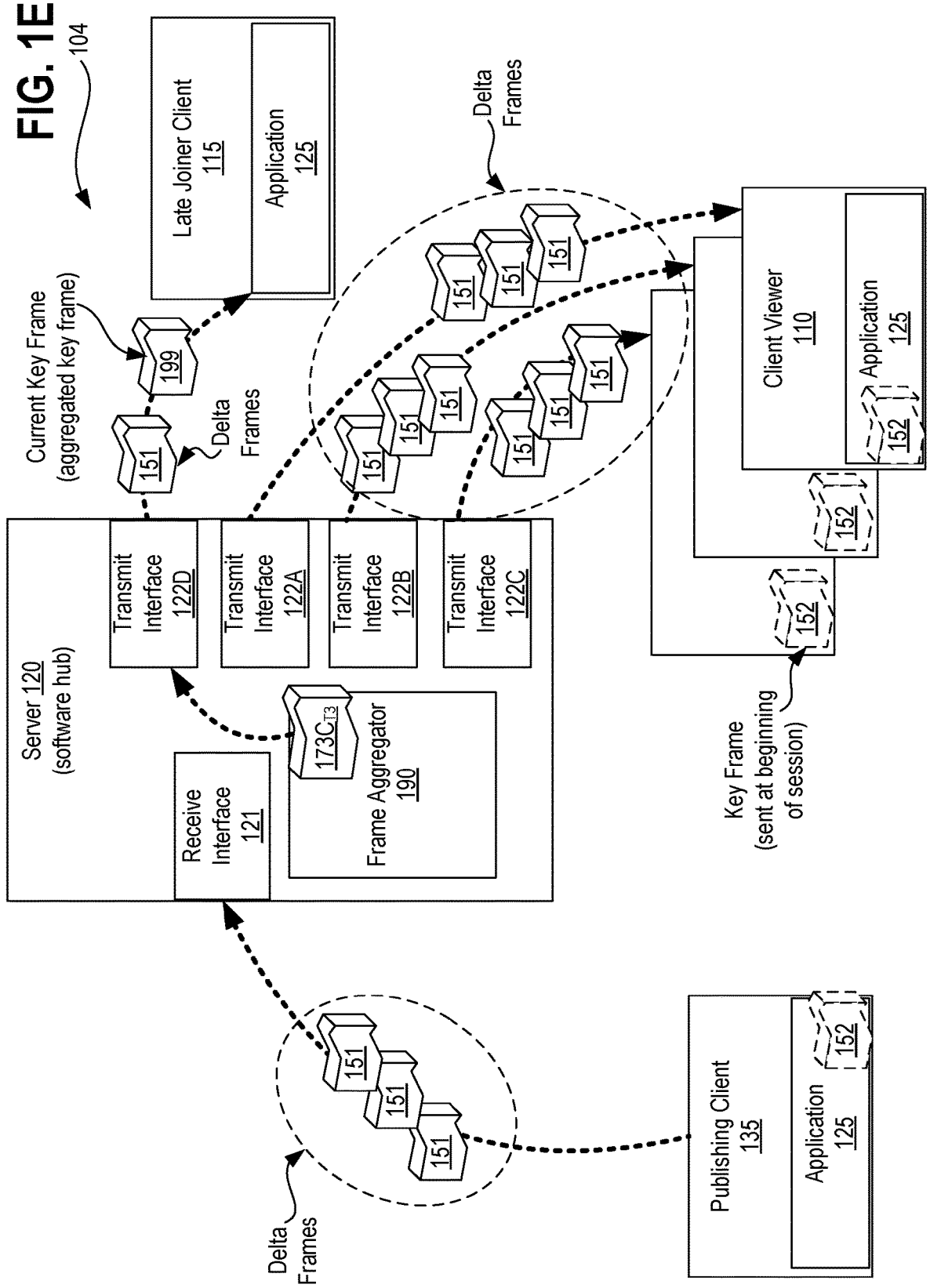

FIG. 2A
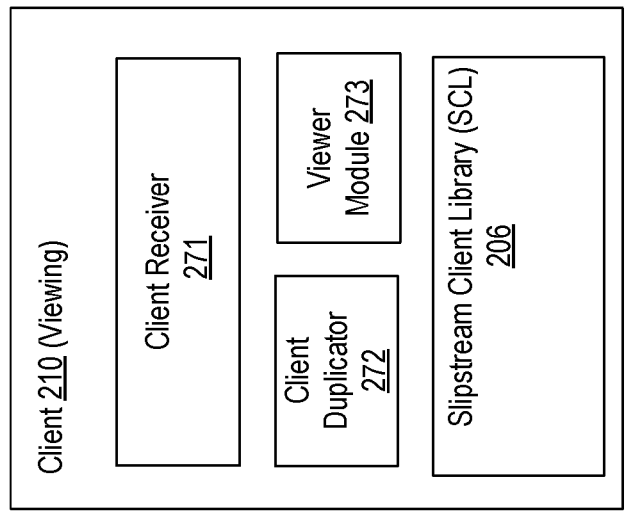
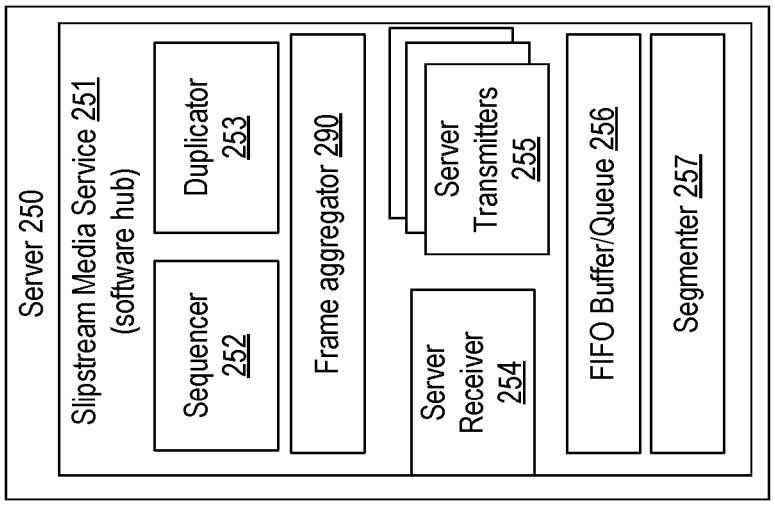
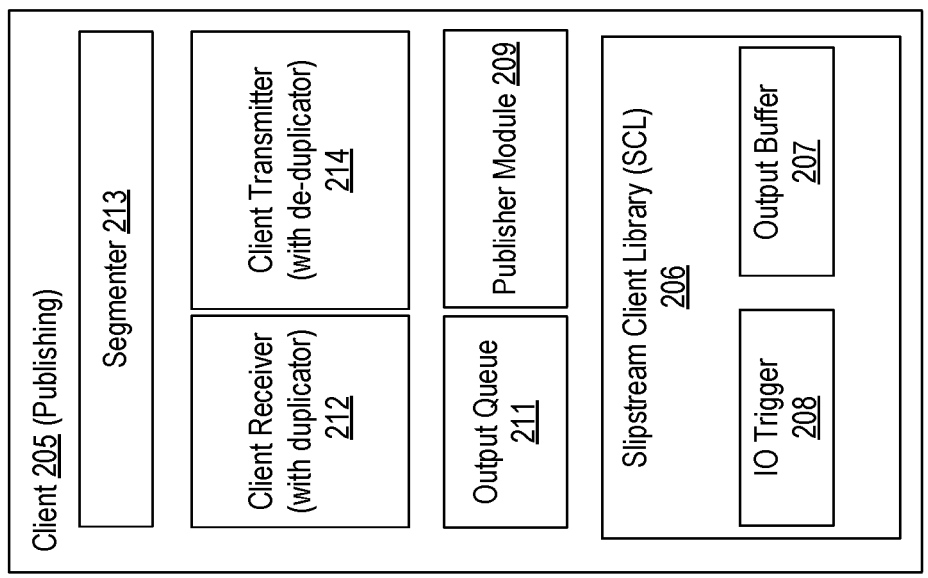

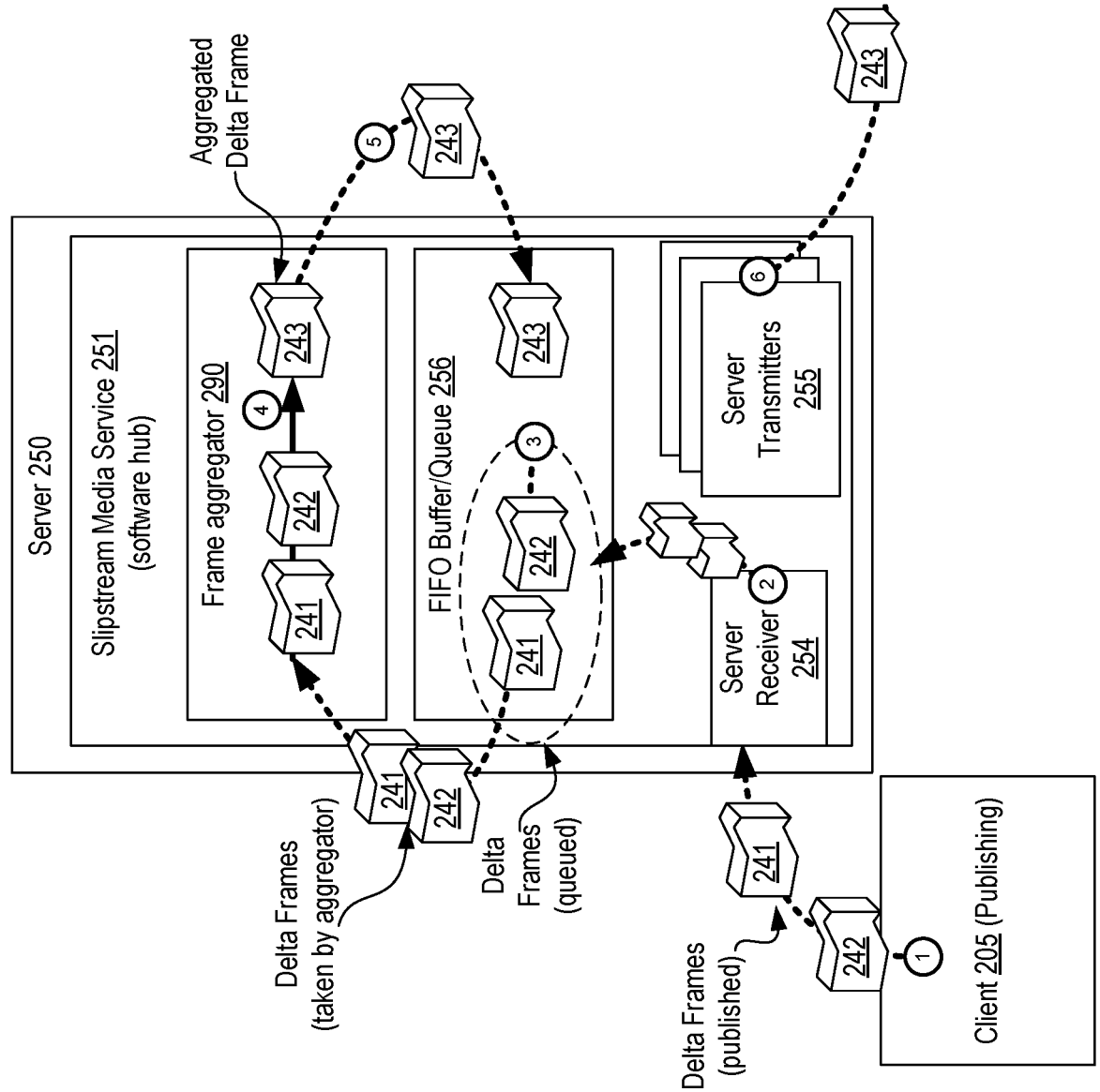

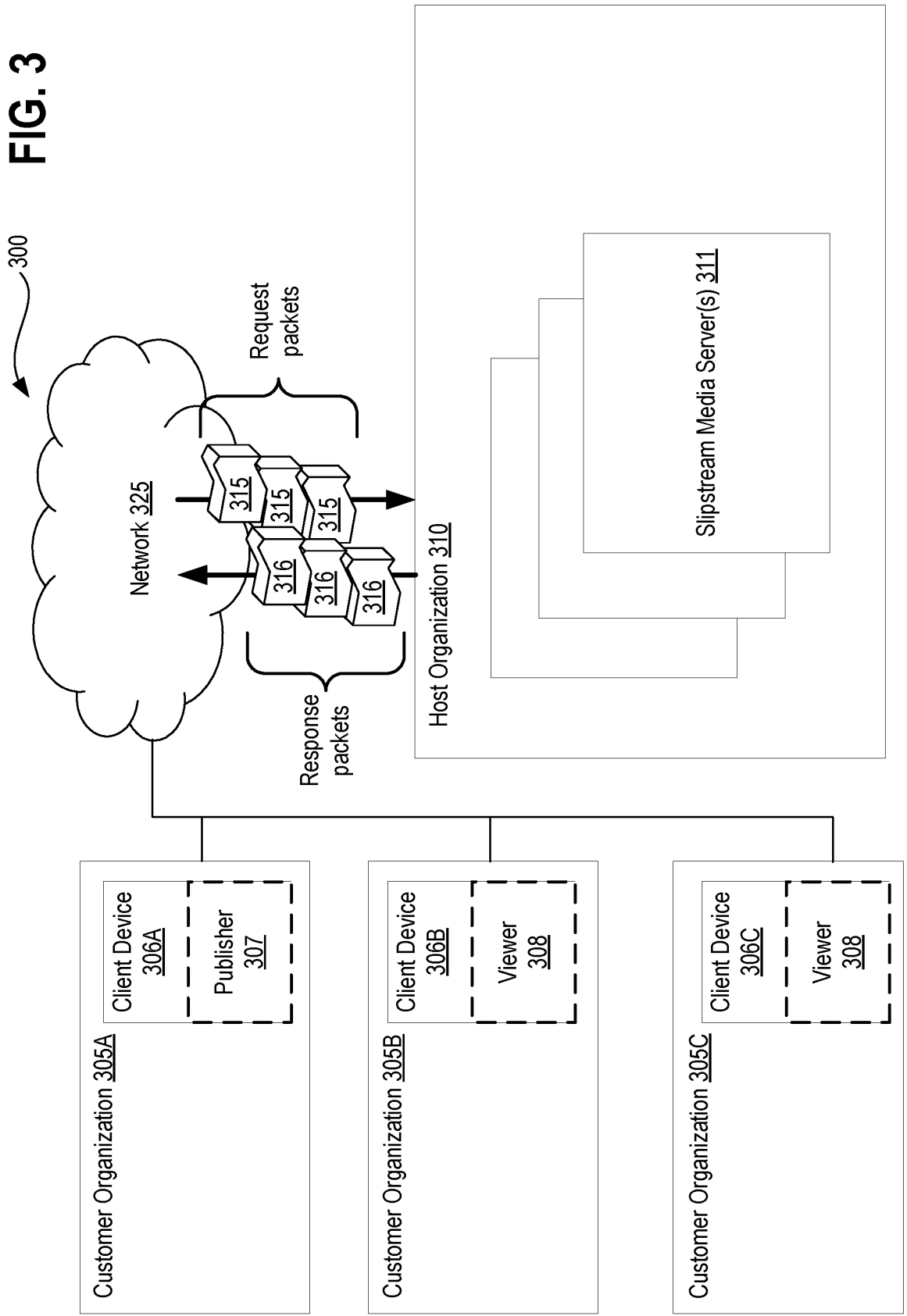

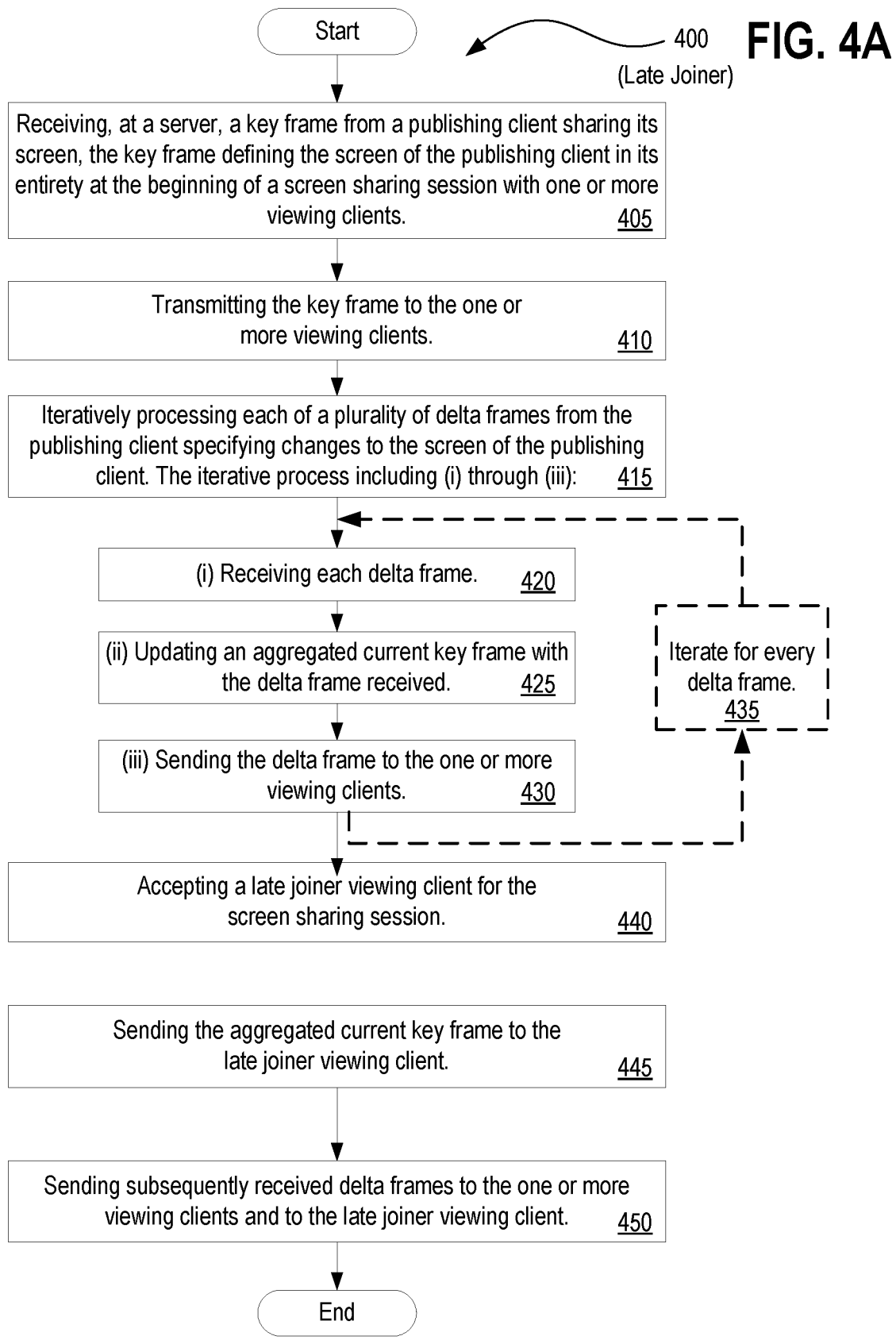

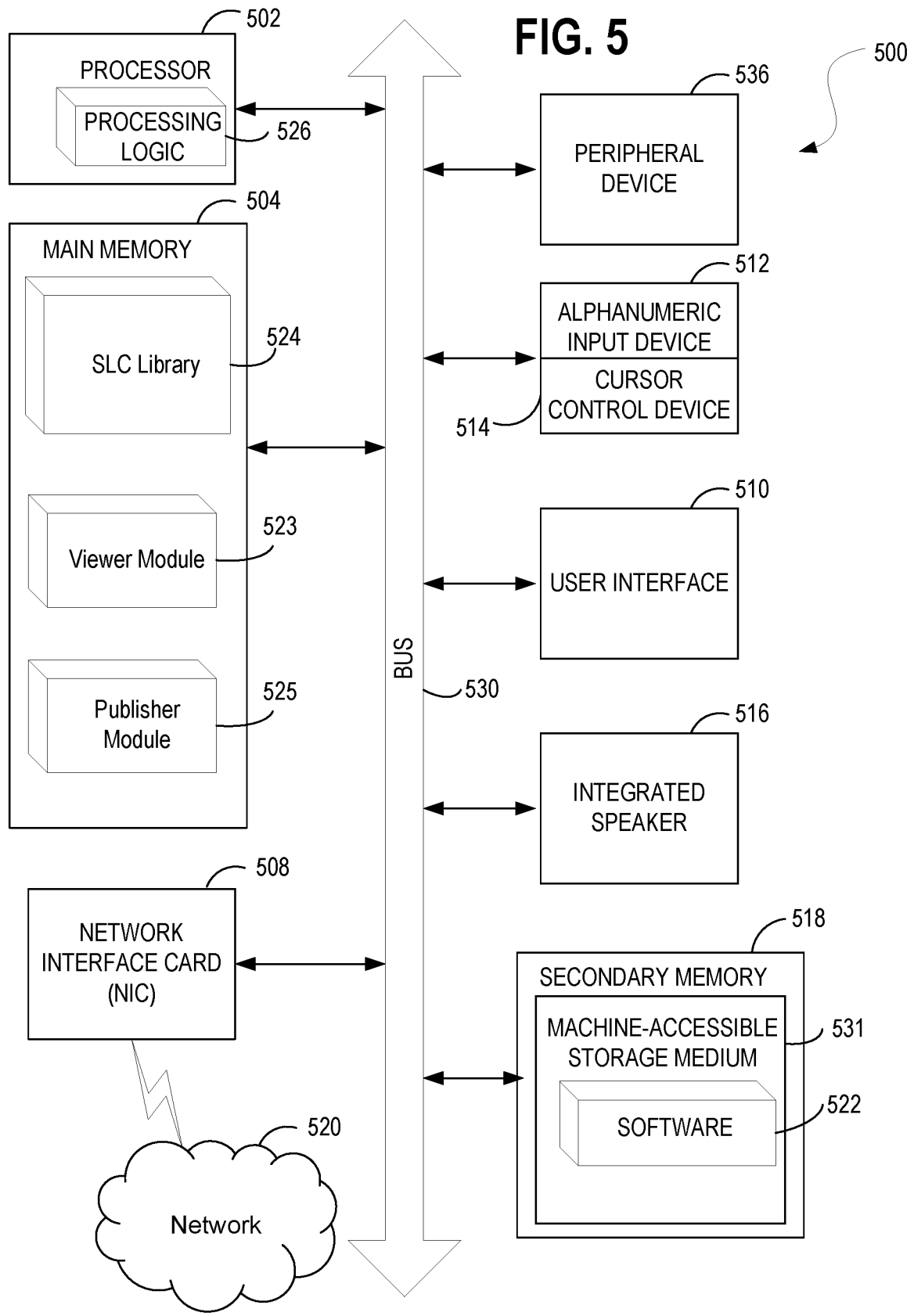

SYSTEMS, METHODS, AND APPARATUSES FOR IMPLEMENTING FRAME AGGREGATION WITH SCREEN SHARING

CROSS-REFERENCE TO RELATED APPLICATIONS

This continuation application is related to, and claims priority to, the utility application entitled "Systems, Methods, and Apparatuses for Implementing Frame Aggregation with Screen Sharing," filed on Nov. 10, 2015, having an application number of Ser. No. 14/937,687, the entire contents of which are incorporated herein by reference; and is related to, and claims priority to, the utility application entitled "Systems, Methods, and Apparatuses for Implementing Frame Aggregation with Screen Sharing," filed on Mar. 15, 2013, having an application Ser. No. 13/840,204 and is now issued as U.S. Pat. No. 9,185,149, the entire contents of which are incorporated herein by reference; and is related to, and claims priority to, the provisional utility application entitled "Methods and Systems for Frame Aggregation in Screen Sharing," filed on Jun. 25, 2012, having an application No. 61/663,692, the entire contents of which are incorporated herein by reference; and is related to, and claims priority to, the provisional utility application entitled "Methods and Systems for Screen Sharing," filed on Jun. 25, 2012, having an application No. 61/663,689, the entire contents of which are incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

STATEMENT REGARDING FEDERALLY SPONSORED RESEARCH OR DEVELOPMENT

Not applicable.

THE NAMES OF THE PARTIES TO A JOINT RESEARCH AGREEMENT

Not applicable.

INCORPORATION-BY-REFERENCE OF MATERIAL SUBMITTED ON A COMPACT DISC OR AS A TEXT FILE VIA THE OFFICE ELECTRONIC FILING SYSTEM (EFS-WEB)

Not applicable.

STATEMENT REGARDING PRIOR DISCLOSURES BY THE INVENTOR OR A JOINT INVENTOR

Not provided.

BACKGROUND OF THE INVENTION

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also correspond to the claimed embodiments.

Screen sharing applications are helpful to meeting participants which are located remotely from each other as the technology can supplement what is heard over a voice channel, such as a telephone line, with a view of a presenter's desktop in real-time. For instance, a presenter may have display text, images, a presentation, or other materials capable of being displayed on a computer screen and those materials are then shared with one or more remote participants who then will see the same materials on their respective computer displays.

When a presenter's bandwidth capabilities are different than a viewer's bandwidth capabilities, problems may arise where the presenter is publishing data faster than the viewer is capable of consuming the data. For instance, if the presenter is transmitting at an exemplary 200 kbps rate and the viewer is capable of receiving at an exemplary rate of 100 kbps, then the viewer will experience significant lag and then likely lose the ability to view the presenter's shared screen due to missing information.

Another problem that arises is with a viewer that attempts to join a screen sharing session already in progress. When a screen sharing session begins, information is shared amongst the viewer participants which forms the basis for establishing and beginning the screen sharing session. A late joiner into the screen sharing session will miss the initially shared information, and thus, be unable to view the shared screen of the presenter's computer display.

The present state of the art may therefore benefit from methods, systems, and apparatuses for implementing frame aggregation with screen sharing and for accepting late joiners with screen sharing as described herein.

FIELD OF THE INVENTION

Embodiments relate generally to the field of computing, and more particularly, to systems, methods, and apparatuses for implementing frame aggregation with screen sharing and for accepting late joiners with screen sharing.

DESCRIPTION OF RELATED ART INCLUDING INFORMATION DISCLOSED UNDER 37 CFR 1.97 AND 1.98

Not provided.

BRIEF SUMMARY OF THE INVENTION

Not provided.

BRIEF DESCRIPTION OF THE SEVERAL VIEWS OF THE DRAWING(S)

Embodiments are illustrated by way of example, and not by way of limitation, and will be more fully understood with reference to the following detailed description when considered in connection with the figures in which:

FIG. 1A depicts an exemplary architecture in accordance with described embodiments;

FIG. 1C depicts an alternative exemplary architecture in accordance with described embodiments;

FIG. 1D depicts an alternative exemplary architecture in accordance with described embodiments;

FIG. 1E depicts an alternative exemplary architecture in accordance with described embodiments;

FIG. 2A depicts another exemplary architecture in accordance with described embodiments;

FIG. 2B depicts another exemplary architecture in accordance with described embodiments;

FIG. 3 depicts an alternative exemplary architectural overview of the environment in which embodiments may operate;

FIG. 4A is a flow diagram illustrating a method in accordance with disclosed embodiments;

FIG. 5 illustrates a diagrammatic representation of a machine in the exemplary form of a computer system, in accordance with one embodiment;

DETAILED DESCRIPTION OF THE INVENTION

Figure 1B:
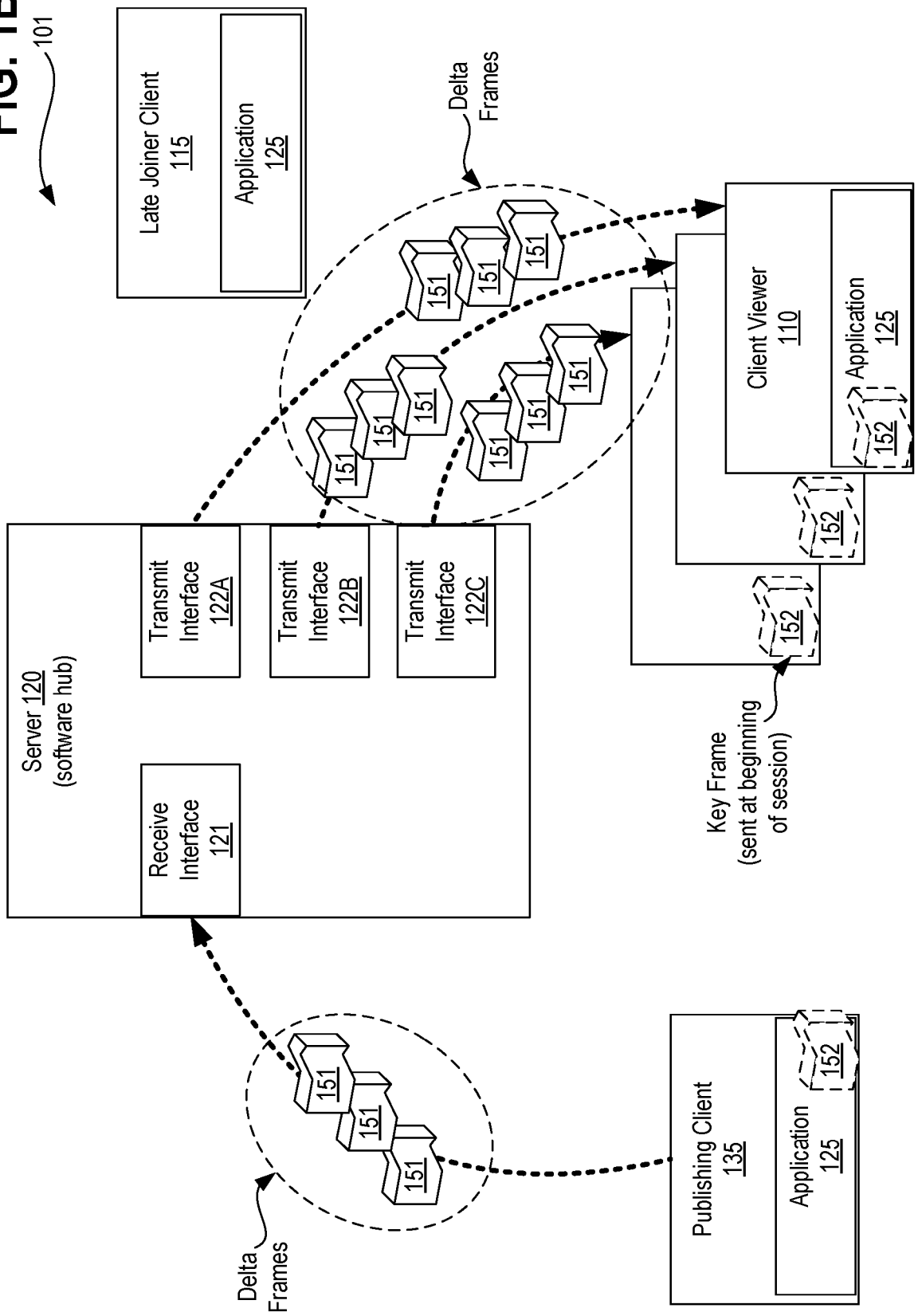
FIG. 1B depicts an alternative exemplary architecture in accordance with described embodiments.

Described herein are systems, devices, and methods for implementing frame aggregation with screen sharing and for accepting late joiners with screen sharing in an on-demand service environment.

In one embodiment, such means include: means for receiving, at a server, a key frame from a publishing client sharing its screen, the key frame defining the screen of the publishing client in its entirety at the beginning of a screen sharing session with one or more viewing clients; transmitting the key frame to the one or more viewing clients; iteratively processing each of a plurality of delta frames from the publishing client specifying changes to the screen of the publishing client, wherein the iterative processing includes: (i) receiving each delta frame, (ii) updating an aggregated current key frame with the delta frame received, and (iii) sending the delta frame to the one or more viewing clients. Such means further include accepting a late joiner viewing client for the screen sharing session; sending the aggregated current key frame to the late joiner viewing client; and sending subsequently received delta frames to the one or more viewing clients and to the late joiner viewing client.

In another embodiment, such means include: means for receiving, at a server, a stream of delta frames from a publishing client as part of a screen sharing session with one or more viewing clients; establishing a FIFO buffer for each of the respective one or more viewing clients on 1:1 basis; queuing a copy of the stream of delta frames into each of the FIFO buffers corresponding to the one or more viewing clients, wherein the stream of delta frames are transmitted from the respective FIFO buffers to the corresponding one or more client viewers; monitoring each of the respective FIFO buffers for each of the one or more viewing clients to determine if two or more delta frames are concurrently queued in any single one of the respective FIFO buffers at any given time; aggregating the two or more delta frames into a single aggregated delta frame; re-queuing the aggregated delta frame; and transmitting the aggregated delta frame to the respective viewing client The techniques described herein improve platform-level screen sharing functionality by solving at least the following deficiencies in the prior art: (1) Provides the ability to aggregate updates on a media server to support viewers who have less inbound bandwidth than the publisher has outbound bandwidth. (2) Provides the ability to aggregate updates on a media server to support late arrival functionality wherein new attendees to a previously established screen sharing session initially receive an entire frame representing the current state of the screen followed by new updates. (3) And provides caching abilities to reduce bandwidth requirements by identifying duplicate updates and transmitting those duplicative updates only once. For instance, after sending an initial update, subsequent transmissions may send a reference to the prior data rather than sending the data itself.

In the following description, numerous specific details are set forth such as examples of specific systems, languages, components, etc., in order to provide a thorough understanding of the various embodiments. It will be apparent, however, to one skilled in the art that these specific details need not be employed to practice the embodiments disclosed herein. In other instances, well known materials or methods have not been described in detail in order to avoid unnecessarily obscuring the disclosed embodiments.

In addition to various hardware components depicted in the figures and described herein, embodiments further include various operations which are described below. The operations described in accordance with such embodiments may be performed by hardware components or may be embodied in machine-executable instructions, which may be used to cause a general-purpose or special-purpose processor programmed with the instructions to perform the operations. Alternatively, the operations may be performed by a combination of hardware and software.

Embodiments also relate to an apparatus for performing the operations disclosed herein. This apparatus may be specially constructed for the required purposes, or it may be a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description below. In addition, embodiments are not described with reference to any particular programming language. It will be appreciated that a variety of programming languages may be used to implement the teachings of the embodiments as described herein.

Embodiments may be provided as a computer program product, or software, that may include a machine-readable medium having stored thereon instructions, which may be used to program a computer system (or other electronic devices) to perform a process according to the disclosed embodiments. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (electrical, optical, acoustical), etc.

Any of the disclosed embodiments may be used alone or together with one another in any combination. Although various embodiments may have been partially motivated by deficiencies with conventional techniques and approaches, some of which are described or alluded to within the specification, the embodiments need not necessarily address or solve any of these deficiencies, but rather, may address only some of the deficiencies, address none of the deficiencies, or be directed toward different deficiencies and problems where are not directly discussed.

FIG. 1A depicts an exemplary architecture 100 in accordance with described embodiments. Depicted here is a slipstream media server 113 having dedicated hardware therein such as a CPU 108 and memory 109 which support the depicted slipstream media service 107. Also depicted is a publishing client 135, a client viewer 110, a key frame 152, and a delta frame 151.

Slipstream media service 107 implements a software hub that acts as a passive relay for transmitting and receiving multimedia data, such as a video stream in a screen sharing session. The slipstream media service 107 may operate via a slipstream media server 113 as depicted, running on dedicated hardware, or the slipstream media service 107 may operate via a generic server or other computing hardware capable of executing the functionality but not necessarily specially configured to do so.

A Slipstream Client Library (SCL) 162 depicted within each of publishing client 135 and client viewer 110 provides a library that contains slipstream client-side platform components, such as a slipstream foundation layer and a slipstream service layer. Depicted within the publishing client 135 is a publisher or publisher module 160A that provides a set of client-side modules responsible for capturing screen images, compressing the images, and producing a stream of incremental updates as the images change. The publisher module 160A may be implemented separately from the Slipstream Client Library (SCL) 162A. Further depicted within the publishing client 135 is a viewer module 161A. Depicted within the client viewer 110 is a viewer or viewer module 161B providing a set of client-side modules responsible for receiving a stream of incremental updates, decompressing them, and updating the screen image in real time. The viewer module 161B may be implemented separately from the Slipstream Client Library (SCL) 162B. Further depicted within the client viewer 110 is a publisher module 160B.

A frame 150 is a data structure that contains information within logical grid representing the screen that is being shared. A key frame 152 is a particular kind of frame 150 that contains a complete set of information or data representing the entire screen that is being shared. For instance, the key frame 152 depicted provides a logical grid of nine individual elements, each of which have data specified as the exemplary data 1 through 9. A delta frame 151 is another particular kind of frame 150 that contains a subset of the information representing one or more portions of the screen area that have changed from one captured screen image to the next, but cannot in of itself produce the entire logical grid representing the screen that is being shared as only partial information is provided (e.g., the delta or changes are specified) with any given delta frame. The exemplary delta frame 151 depicted provides a logical grid of nine individual elements, but only two of them have data specified, specifically 5' (five prime) and 9' (nine prime), thus representing two screen elements that have changed since the prior frame. The delta frame 151 is much smaller in size than a key frame 152 because it contains only a subset of the data. A combined frame is another particular type of frame which contains both a key frame and a delta frame corresponding to a single point in time, thus, the key frame portion of the combined frame provides the information necessary to reproduce an entire screen and the delta frame portion provides only a sub-set of information for the screen, and either may be selected and processed by the viewer module 161 as appropriate at a client viewer 110 device. A delta frame 151 always contains a subset of the information included in a key frame 152 because, by definition, if all of the information were present in a delta frame 151 then it would not represent only the changes, but instead, it would be a key frame 152 having all the information necessary to produce the shared screen in its entirety at a given point in time.

Certain video applications, such as those which utilize a Moving Picture Experts Group (MPEG) compatible protocol or an H.264 compatible protocol, require the sharing of I-Frames and P-Frames as part of their compression schemes. An I-frame is an "Intra-coded picture" which represents a fully specified picture, much like a conventional static image file, except that it is one frame of a sequence which makes up video. The P-frame which is a "Predicted-picture" frame holds only part of the image information for a given frame of video, and as such, they are smaller in size than an I-frame which reduces bandwidth requirements and improves compression (P-frames are also known as delta-frames). For example, in a scene where a car moves across a stationary background, only the car's movements need to be encoded. The encoder does not need to store the static background pixels in the P-frame, thus saving space. Such P-frames are thus similar to delta-frames and I-Frames are similar to key frames 152.

With a desktop sharing application, much of the desktop is likely to remain static from frame to frame, for instance, the background may be static and a presentation may be partially static with only a curser position changing or various highlighted portions of text requiring a change to the display pixels.

Because key frames and I-Frames represent an entire image rather than only a delta, it may be infeasible to constantly transmit them due to their size. For instance, the bandwidth capabilities of a client device sharing the or viewing a desktop may be insufficient to transport a constant stream of I-Frames or key frames, and thus, compression is necessary, for instance, via the delta frames/P-Frames which reduce bandwidth requirements by sharing only changed state information. Usage of delta frames/P-Frames, however, requires that all be available and without loss because any missing delta frames/P-Frames from the sequence results in changes that will not be encoded or represented in future delta frames/P-Frames. Because no subsequent key frame/I-Frame will be forthcoming, the data will remain missing indefinitely. Thus lossy transports are not compatible with such protocols.

FIG. 1B depicts an alternative exemplary architecture 101 in accordance with described embodiments. In particular, there is a server 120 which is communicably interfaced with a publishing client 135 and three client viewers 110. Server 120 may operate the slipstream media service 107 described above.

The publishing client 135 is publishing delta frames 151 for an active screen sharing session for the executing application 125 at the publishing client 135 and client viewers 110. The delta frames 151 are being shared with client viewers 110 through the server 120, thus establishing the screen sharing session from the publishing client 135. Late joiner client 115 is depicted but has not joined the screen sharing session and as such, is not receiving the delta frames 151.

Server 120 operating as a software hub is depicted as receiving delta frames 151 at receive interface 121 from the publishing client 135, for instance, via a publisher module. Server 120 is further depicted as transmitting the delta frames 151 via transmit interfaces 122A, 122B, and 122C to the client viewers 110. The depicted key frames 152 were transmitted previously at the beginning of a screen sharing session for application 125, but are not required to maintain the screen sharing session as the publisher at the publishing client 135 sends only changes from frame to frame and the viewer module at the client viewer 110 devices consume the delta frames 151 to update the screen sharing session with respect to the screen elements that have changed. Notably, if the late joiner client 115 were to attempt to join at this stage, it would be lacking the key frame 152 shared at the beginning of the session, and thus, the delta frames 151 having only a subset of the data for a present screen would be insufficient.

FIG. 1C depicts an alternative exemplary architecture 102 in accordance with described embodiments. Depicted at the bottom is the direction of time 171, upon which there are four distinct time positions marked, with $time_0$ at element 180, $time_1$ at element 181, $time_2$ at element 182, and $time_3$ at element 183. Key frame 172 is depicted having all nine screen elements specified to provide a complete frame, much like a jpeg image or other static picture. Delta frame 173A is depicted with only two elements specified, 5' and 9' (five-prime and nine prime), and as such, is much smaller in size. A viewer module consuming delta frame 173A with only a subset of the screen data requires the key frame 172 having all the data if the delta frame 173A is to be interpreted correctly. Delta frame 173B is next with only one screen element specified. If delta frame 173B is to be interpreted properly then the preceding delta frame 173A is required to have been received and processed. Lastly, delta frame 173C depicts three screen elements, 1', 2", and 3' (one prime, two double prime, and three prime), and as before, interpreting delta frame 173C requires having correctly received and processed all preceding delta frames at $time_1$ and $time_2$. Each of the respective delta frames 173A-C has only the changes between two time points.

In such a way, the publisher which is providing the screen sharing data continuously sends a series of intermittent frames, the delta frames, and the viewers continuously consume the delta frames by re-painting only those portions of the screen that are specified as having been changed.

So long as all viewers receive the key frame 172 shared at the beginning of the process they correctly receive, process, and interpret the intermediate delta frames 173A-C without any special handling. Unfortunately, if a late joiner client 115 is to also participate in the screen sharing session, it requires an I-Frame/key frame from the publisher, but such a frame will not be forthcoming, and as such, the late joiner is unable to understand the stream of delta frames 173C upon joining late.

FIG. 1D depicts an alternative exemplary architecture 103 in accordance with described embodiments. Depicted here is the late joiner client 115 joining the screen sharing session late, thus missing the key frame 172. In particular, the late joiner client 115 joins after $time_3$ at element 183 and prior to $time_4$ at element 184. At the server 120, to generate the missing I-Frame/key frame on the fly, it would be necessary to decompress the stream and then render it into a buffer for the late joiner client 115, however, doing so is extremely processor intensive and additionally requires appropriate codecs, whereas simply receiving and forwarding the delta frames requires no such decompression or codecs.

The server 120 therefore maintains a key-frame via a frame aggregator 190 by accepting the initial key frame 172 at $time_0$ and then updating the key frame with each subsequent delta frame 173A-C. Thus, after $time_3$ when the late joiner client 115 joins into the screen sharing session, the server 120 has a current key frame which can be provided to the late joiner client 115. As depicted here, key-frame at $time_3$ ($173C_{T3}$) is provided to the late joiner client 115 after $time_3$ which thus brings the late joiner client 115 to a current state as it has all the information necessary to paint a complete screen of the current screen sharing session. The late joiner client 115 can then accept delta frames as is depicted with the frame aggregator sending the late joiner client 115 delta frames 173D for $time_4$ and then 173E for $time_5$.

FIG. 1E depicts an alternative exemplary architecture 104 in accordance with described embodiments. Depicted here the late joiner client 115 picks up the stream for the screen sharing session by receiving from the necessary packets from transmit interface 122D of the server 120. In particular, late joiner client 115 receives the current key frame 199 (e.g., aggregated key-frame $time_3$ $173C_{T3}$ after $time_3$ from FIG. 1D) and then operates in the same manner as the other client viewers 110 by receiving only delta frames 151 thereafter.

The server 120 maintains a current key frame 199 (e.g., aggregated key frame) at all times, with the frame aggregator 190 updating its current key frame 199 with each delta frame 151 received. The frame aggregator 190 then sends the current key frame 199 at the appropriate time for any late joiner client 115 which missed the key frame 152 sent at the begging of a screen sharing session.

Figure 1F:
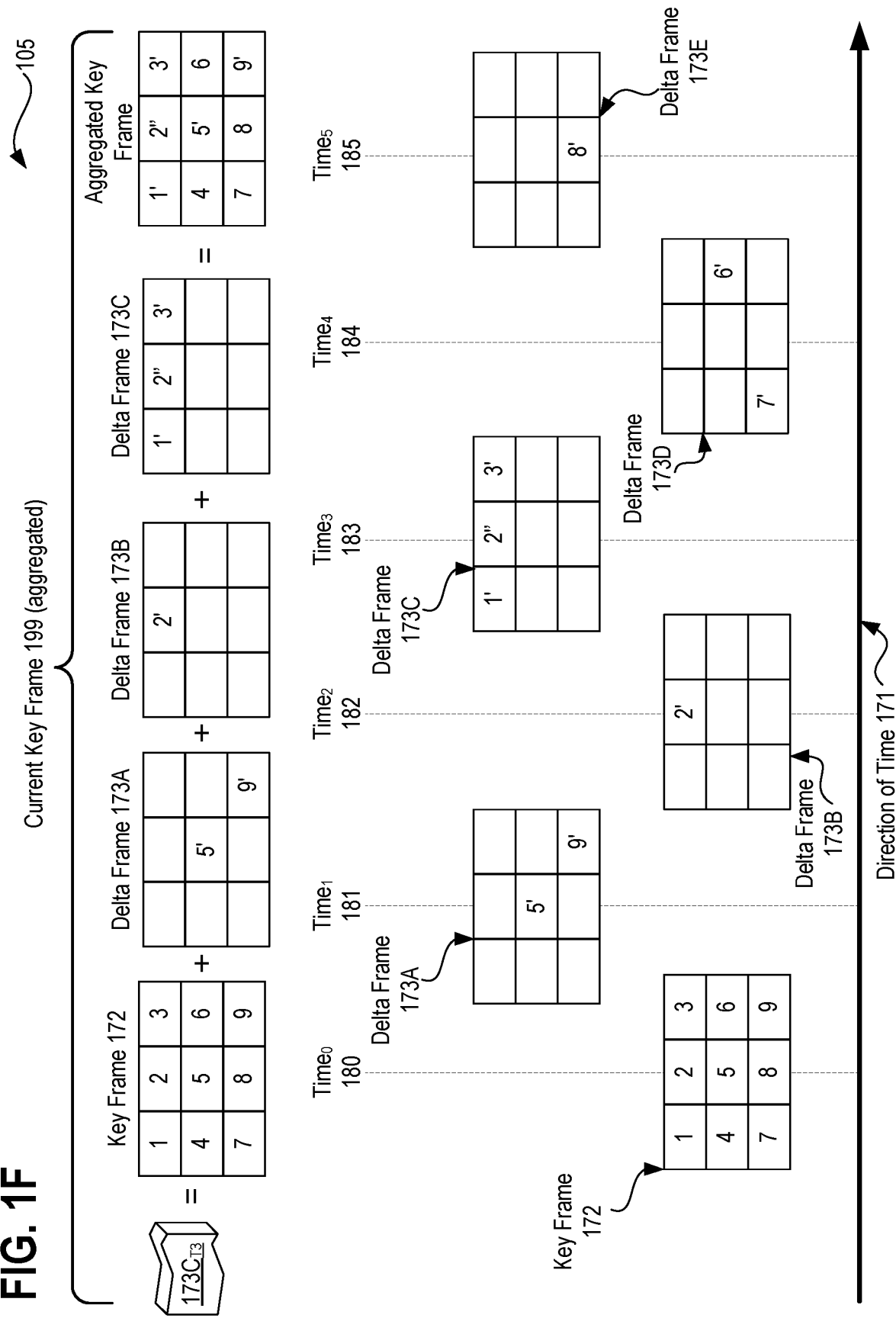
FIG. 1F depicts an alternative exemplary architecture in accordance with described embodiments.

FIG. 1F depicts an alternative exemplary architecture 105 in accordance with described embodiments. Depicted here is the means by which the frame aggregator 190 determines the current key frame 199. As is shown for $time_3$ key-frame $time_3$ $173C_{T3}$, the sum of key frame 172 from $time_0$ along with delta frames 173A, 173B, and 173C, from $time_1$, $time_2$, and $time_3$, respectively. Summing together results in the aggregated key frame at the end which retains the original elements 4, 6, 7, and 8, along with 1', 2", 3', 5', and 9', thus representing a complete set of screen elements as would be the case with an original key frame 172, but updated according to all changes up through $time_3$ for this particular example, The process would simply continue for $time_4$ at element 184 and $time_5$ at element 185.

Figure 1G:
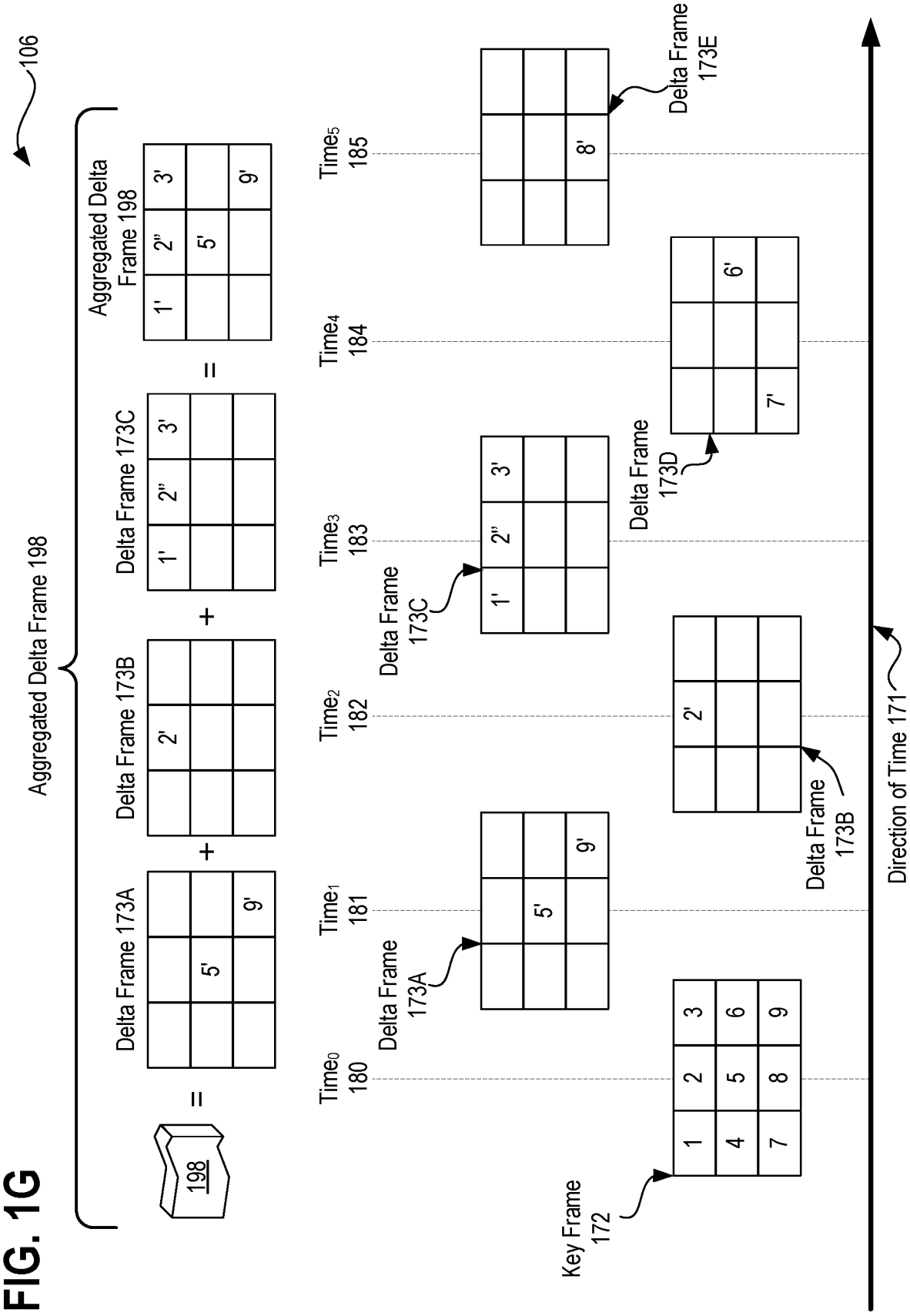
FIG. 1G depicts an alternative exemplary architecture in accordance with described embodiments.

FIG. 1G depicts an alternative exemplary architecture 106 in accordance with described embodiments. In particular, an aggregated delta frame 198 is depicted. Unlike an aggregated current key frame 199 which represents the complete current state of a screen on behalf of a late joiner client, any two or more sequential delta frames may be aggregated also to create an aggregated delta frame 198 by summing the two or more sequential delta frames as depicted. Thus, the resulting aggregated delta frame 198 on detailed on the right hand side has values for 1', 2", 3', 5', and 9', but does not represent a complete set of screen elements. Nevertheless, a viewing client that receives the aggregated delta frame 198 will process it as though it were an ordinary delta frame generated by the client publisher. Such aggregated delta frame 198 are created when a buffer or queue has two or more sequential delta frames, and may be beneficial to reduce total bandwidth requirements for a viewer client having lesser bandwidth capability than the publisher client.

Aggregating two or more delta frames into an aggregated delta frame 198 improves efficiency through better compression and less overhead to transmit the same quantity of data.

FIG. 2A depicts another exemplary architecture 200 in accordance with described embodiments. In particular, the server 250 and clients 205 (publishing) and 210 (viewing) are depicted in additional detail in accordance with certain embodiments.

The flow of data, from a publisher client to a viewer client involves a series of functional modules, some on the client side and some the server side, as well as a bidirectional IP network capable of TCP/IP. Because the server 250 may provide the slipstream media service 251 as a cloud based service, it may be necessary for the clients, publishers and viewers, to communicate with the server 250 over a public Internet.

The client transmitter 214 operates as a trigger and thus a stating point. The slipstream client library (SCL) 206 contains an IO trigger 208 software module that drives I/O (Input/Output) at an exemplary period of 50 ms. When this trigger occurs at 50 ms cycles, the slipstream client library 206 checks the state of it's output buffer 207 facing toward the server 250. If the amount of outbound data in the output buffer 207 is less than a preset amount (typically equal to the current outbound packet size), then the IO trigger 208 calls the publisher module's 209 method( ) Islip-Stream-Processor::Processor-Ready.

As part of the initialization process, the Islip-Stream-Service-Layer::Register-Screen-Share-Publisher returns a pointer to client transmitter 214 used to output data from the publisher module 209. The IO trigger's 208 call to Processor-Ready initiates a process of screen-capture and compression yielding a frame. Once the frame is ready, the publisher module 209 passes the frame to the transmitter's Islip-Stream-Processor::Process( ) method.

The client transmitter 214 next packages, addresses, sequences, and tags the frame. When the publisher module 209 delivers a frame to the slipstream client library 206 it creates a new media object. Media objects are containers for streamed data, including video frames, audio frames, photos, control info and more. The media object may be enhanced to support tags necessary for screen sharing frames. Two fields in the media object support Lossless Sequencing. LosslessSequenceNumber which is the sequence number for this object, and LosslessAggregationCount, which as a default value of 1. For example, a valid sequence of objects is: Object w/Sequence #3, aggregation count 1 object w/sequence #4, aggregation count 2 object w/sequence #6, aggregation count 1.

The frame is added as payload to the media object and each object is assigned a sequence number which is used to reorder frames as needed, at various stops along the way. Sequence numbers may be assigned in the SlipStreamServiceLayer as frames are received from the publishing client 205. The resulting frame, after being tagged with a sequence number, may optionally be prioritized and placed in an output queue 211 with appropriate priority.

After placing the frame in the output queue, the IO Trigger 208 may check to determine if there is more than one frame in the output queue 211, although it is expected that there would be little, if any, aggregation occurring on the client's transmitter 214 absent serious contention for network access or other processing delay preventing the outputting of frames. Nevertheless, if there is more than one frame in the output queue 211, then the multiple frames are aggregated at the client 205 and the result is substituted in the output queue 211 for the older of the two frames.

A de-duplicator module of the client transmitter 214 processes frames when they are passed from the output queue to a segmenter 213 at which point the data is committed to send and thus, no longer subject to aggregation. The de-duplicator module is paired with a duplicator module and these two modules are connected by a bandwidth constrained network connection. According to one embodiment, a de-duplicator is located within the client transmitter 214 of the publishing client 205 and a duplicator is located within the client receiver 212 of the publishing client 205. The de-duplicator transmits frames either "by value" or "by reference." Frames that are sent "by value" are automatically stored in the duplicator's cache when the client receiver 212 receives the frames. Frames that are sent "by reference" are retrieved from the duplicator's cache and processed as if they were received "by value."

After de-duplication, frames are placed into the segmenter 213 from where they are transmitted to the server 250 using one or more TCP/IP transmissions.

A server 250 which implements the slipstream media service 251 receives a sequence of packets via TCP with each packet containing one or more segments. The segments are assembled back into media objects, each containing a single frame in a process referred to as de-segmentation. Because frames may not be received in the same order they were transmitted by the client transmitter 215 sequencing may be necessary as the erroneous ordering may have an adverse effect on caching. A sequencer 252 thus sequences the frames at the server 250. Sequencing is lossless, as opposed to audio sequencing, for example, where it may be acceptable to "give up" on delayed frames after a period of time. Packets that appear to be delayed for a period of time exceeding a threshold will trigger a re-transmission while ensuring that other packets are successfully sent and received during the same period of time.

Once packets are received, reassembled, and sequenced, the resulting frame objects are sent to a duplicator 253 which converts screen information sent "by reference" to the actual frames, "by value." The result is a new and expanded frame object that is passed along to a frame aggregator 290 at the server. Frame aggregator 290 combines updates from two or more P-Frames or delta frames, yielding a single aggregated frame that represents the combined updates. In certain embodiments the frame aggregator 290 continuously maintains a current key frame by aggregating all changes specified by P-Frames or delta frames in case a current key frame is required for a late joiner client to an existing screen sharing session. The frame aggregator 290 alternatively aggregates two or more P-Frames or delta frames into a single aggregated P-Frame or delta frame, but not a current aggregated key frame.

The frame aggregator's 290 process produces a union of the screen portions contained in the old delta frame and the screen portions in the new delta frame. If a single corresponding screen portion exists in both frames, the screen portion in the new frame takes precedence to overwrite the corresponding screen portion in the old frame. This union is then used by the frame aggregator 290 to create the new aggregated delta frame. Where the frame aggregator 290 aggregates all frames that pass through into a single current key frame, late-joiners are sent the current key frame so that they have a valid starting point for receiving subsequent changes. The resulting aggregated frame is added to the original expanded frame object yielding a single frame object that contains both a key frame containing the entire set of information which represents the full screen image, as well as a delta frame containing only the set of recently changed screen portions.

A KeyFrame selector function has a method called 'SelectKeyFrame' which enables a "KeyFrameMode." When this mode is enabled, the next frame received by KeyFrameSelector may be converted into a current aggregated key frame, and the flag is then cleared. When KeyFrameMode is disabled, subsequent frames remain as "delta frames."

A distribution task inside the media server distributes the combined frame object pursuant to which the combined frame object arrives at each of the server transmitters 255. The server transmitters 255 are server 250 side components responsible for controlling the flow of data from the media service 251 to the client(s) 205. Each client may have its own server transmitter 255 dedicated exclusively to supporting its transmission needs. That is, server transmitters 255 may be allocated on a 1:1 basis to any number of viewing clients 210. Similarly, sequencers, frame aggregators, and FIFO buffers may be allocated on a 1:1 basis to any number of viewing clients 210.

Because media objects may arrive at server transmitters 255 in a different order than the server receiver 254 sent them, it may be necessary to sequence the frames again, when they arrive at the server transmitter 255 via a sequencing function for the server transmitters 255. After sequencing, the server transmitters 255 convert a combined frame object into either an aggregated current key frame (containing all information, screen portions, or data required) or an aggregated delta frame (containing only recent changes)— depending on a flag which is set for the particular server transmitter 255 indicating whether the server transmitter 255 is servicing a late joiner client. If the server transmitter 255 is servicing an existing viewing client 210 then delta frames are aggregated only when there are two or more adjacent and sequential delta frames presently accessible to the server transmitter 255. If only one such delta frame is present the server transmitters 255 do not wait to transmit, instead, they simply transmit without performing aggregation.

The resulting frame, whether an aggregated current key frame, an aggregated delta frame, or a single delta frame which was not aggregated, is placed into a FIFO buffer 256 with an output priority appropriate for the screen share data. If there is already a screen share frame in the FIFO buffer 256 then the new frame may optionally be aggregated with the old, and the resulting aggregated delta frame will then replace the old frame, retaining its order in the FIFO buffer 256. The Each client 210 (viewing) may have its own corresponding duplicator 253 at the server 250, and thus, each server transmitter 255 may have its own de-duplicator function. In this instance, the de-duplicator function performs the same caching functionality as the publishing client's 205 de-duplicator. The contents of the publishing client's 205 cache are not related to the contents of any viewing client's 210 cache. The de-duplicator operates on data at the point it is being extracted from the FIFO buffer 256, just before it is packed for transmission via the server transmitters 255. After being processed by the de-duplicator, a frame is placed into the server's segmenter 257. Eventually, the frame is segmented, packed, and transmitted to the viewing client 210 using the return legs of one or more TCP/IP transmissions.

At the viewing client 210 a sequence of packets is received via TCP responses at the client receiver 271. Each packet may contain one or more segments which are assembled back into media objects, each containing a single frame in a process called de-segmentation. Because the frames may not be received in the same order they were transmitted to the client by the server transmitter 255 the client receiver 271 sequences the frames again when they arrive at the viewing client 210. Once packets have been received, reassembled and sequenced, the resulting frame objects are sent to the client duplicator 272 which converts screen portions sent "by reference" to the actual frames, "by value." The result is a new and expanded frame object that is passed along to the method( ) Islip-Stream-Processor registered by Islip-Stream-Service-Layer::Register-Slip-Stream-Viewer.

The viewer module 273 is responsible for rendering the resulting images on the screen of the viewing client 210 device.

FIG. 2B depicts another exemplary architecture 201 in accordance with described embodiments. In particular, the delta frame aggregation process is depicted in additional detail. Server 250 is shown with its frame aggregator 290 and FIFO Buffer/Queue 256 internal to the slipstream media service 251.

Frame aggregation is the process of combining two 'delta' frames (aka 'P-Frames)—each representing state changes from adjacent time periods—into a single delta frame. Areas in the older frame that are overlapped by corresponding areas in the newer frame are not contained in the result. Frame aggregation may be utilized to reduce the bandwidth requirements for a stream by reducing the number of frames transmitted.

Server 250 receives delta frames 241 and 242 from publishing client 205 at server receiver 205 (operation 1), which are subsequently passed into the queue 256 (operation 2) to be transmitted to the viewing client 210.

Before the server transmitters 255 transmit the queued delta frames to a viewing client 210, the queue 256 is checked to determine if two or more sequential/adjacent delta frames are present and waiting in the queue. This may occur if the viewing client 210 lacks sufficient bandwidth to keep pace with the publishing client 205. When two or more sequential/adjacent delta frames are present, as depicted, the sequential/adjacent delta frames are taken by the frame aggregator 290 for delta frame aggregation (operation 3). The frame aggregator 290 combines the two delta frames 241 and 242 into a new aggregated delta frame 243 (operation 4) which is then returned back to the queue 256 (operation 5). The server transmitters 255 then take the aggregated delta frame 243 and transmit it (operation 5) to the viewing client 210 which will process the aggregated delta frame 243 as though it were an ordinary delta frame, without knowledge that any aggregation process occurred at the server 250.

The delta frame aggregation process involves three screen portions; an old screen portion, a new screen portion, and resulting screen portion. The process creates the resulting screen portion by combining the old screen portion with the new screen portion. If the new screen portion is a key frame then the new screen portion is simply copied to the result key frame. If the new screen portion is not a key frame, then all screen portions from the source frames are copied to the result frame, unless there are screen portions with equal identifiers included in both the old and new frames, then the screen portion in the old frame is not copied to the result frame. This process is performed in a way which ensures that the screen portions in the resulting frame are in ascending order of their respective identifiers.

In the event that there are no overlapping screen portions in successive frames, the only bandwidth reduction would be represented by the elimination of headers. As a result, the frame aggregator 290 may optionally aggregate frames only when there are overlapping areas in the old and new frames which would allow the user to see interim changes contained in the old frame before the new frame arrives.

An abstract class called IScreenShareFrame contains a single frame in a stream and provides these member variables: 1) IsKeyFrame, which if true, then the frame is a key frame and if not true then the frame is a delta frame. 2) ScreenWidth and ScreenHeight specifying the dimensions of the screen is transmitted for key frames only. The frame aggregation process does not reference the ScreenWidth and ScreenHeight fields. 3) A list of screen portions in which each specified screen portion contains: a) Identifier which identifies the physical position of the screen portion within the visible frame, used to determine if two screen portions overlap. Screen portions should be added to each frame in ascending order according to their identifier and each screen portion identifier should only be used once per frame. b) screen portion payload which is a buffer that contains the compressed representation of the screen portion. The payload is transmitted but is not referenced by the aggregation process.

FIG. 3 depicts an alternative exemplary architectural overview 300 of the environment in which embodiments may operate. In particular, there are depicted multiple customer organizations 305A, 305B, and 305C. Obviously, there may be many more customer organizations than those depicted. In the depicted embodiment, each of the customer organizations 305A-C includes at least one client device 306A, 306B, and 306C. A user may be associated with such a client device, and may further initiate requests to the host organization 310 which is connected with the various customer organizations 305A-C and client devices 306A-C via network 325 (e.g., such as via the public Internet). In such a way, the host organization 310 may operate the slipstream media servers 311 as a cloud service remote from the client devices 306-A-C and facilitate the exchange of information (e.g., response packets 316 and request packets 315) between publisher 307 and viewer 308 modules of the respective client devices 306A-C. Such an architecture negates the need for any particular client organization 305A-C to install and maintain the server-side software locally.

FIG. 4A is a flow diagram illustrating a method 400 in accordance with disclosed embodiments. Method 400 may be performed by processing logic that may include hardware (e.g., circuitry, dedicated logic, programmable logic, microcode, etc.), software (e.g., instructions run on a processing device to perform various operations such transmitting, sending, receiving, monitoring, recording, updating, calculating, etc., in pursuance of the systems, apparatuses, and methods for accepting late joiners with screen sharing, as described herein. For example, server 120 of FIG. 1B may implement the described methodologies. Some of the blocks and/or operations listed below are optional in accordance with certain embodiments. The numbering of the blocks presented is for the sake of clarity and is not intended to prescribe an order of operations in which the various blocks must occur.

At block 405, processing logic at a server receives a key frame from a publishing client sharing its screen. In such an embodiment, the key frame defines the screen of the publishing client in its entirety at the beginning of a screen sharing session with one or more viewing clients.

At block 410, processing logic transmits the key frame to the one or more viewing clients.

At block 415 through sub-blocks 430, processing logic iteratively processing each of a plurality of delta frames from the publishing client specifying changes to the screen of the publishing client. Such iterative processing includes sub-blocks (i) through (iii) at 420, 425, and 430, and loops or iterates via block 435.

Processing logic at sub-block 420 (i) receives each delta frame.

Processing logic at sub-block 425 (ii) updates an aggregated current key frame with the delta frame received.

Processing logic at sub-block 430 (iii) sends the delta frame to the one or more viewing clients. Processing then loops through block 435 as necessary to iterate for every delta frame. Because such delta frames arrive as a stream, such processing may continue for a very long while.

At some point in time the late joiner viewing client requests access to the screen sharing session. Thus, at block 440, processing logic accepts a late joiner viewing client for the screen sharing session. This late viewer will have missed the key frame and many of the delta frames, and thus, the current state of the shared screen will need to be conveyed to the late joiner viewing client before it will have the appropriate base position and context to interpret subsequent delta frames.

Thus, at block 445, processing logic sends the aggregated current key frame to the late joiner viewing client. Though this aggregated current key frame does not come from the publishing client, it contains all the information necessary to specify the screen of the publishing client in its entirety without requiring the stream be decoded and rendered separately to the late joiner viewing client.

At block 450, processing logic sends subsequently received delta frames to the one or more viewing clients and to the late joiner viewing client. Thus, at this stage, the late joiner viewing client operates the same as the other one or more viewing clients and can process the same delta frames received by the other one or more viewing clients that were present at the beginning of the screen sharing session and thus received the original key frame from the publishing client.

Thus, it is in accordance with the disclosed embodiments that a method includes: receiving, at a server, a key frame from a publishing client sharing its screen, the key frame defining the screen of the publishing client in its entirety at the beginning of a screen sharing session with one or more viewing clients; transmitting the key frame to the one or more viewing clients; iteratively processing each of a plurality of delta frames from the publishing client specifying changes to the screen of the publishing client, in which the iterative processing includes: (i) receiving each delta frame, (ii) updating an aggregated current key frame with the delta frame received, and (iii) sending the delta frame to the one or more viewing clients; accepting a late joiner viewing client for the screen sharing session; sending the aggregated current key frame to the late joiner viewing client; and sending subsequently received delta frames to the one or more viewing clients and to the late joiner viewing client.

According to another embodiment, the method further includes: establishing a communications interface with the publishing client prior to receiving the key frame from the publishing client; and establishing a communications interface with the one or more viewing clients to share the screen from the publishing client prior to receiving the key frame from the publishing client.

According to another embodiment, the method further includes: transmitting the key frame to the one or more viewing clients prior to accepting the late joiner viewing client for the screen sharing session; and transmitting one or more of the plurality of delta frames from the publishing client to the one or more viewing clients prior to accepting the late joiner viewing client for the screen sharing session.

According to another embodiment, the method further includes: storing the key frame from the publishing client sharing its screen at the server as a current key frame for $time_0$ corresponding to the start of the screen sharing session; receiving a first of the plurality of delta frames from the publishing client at $time_1$; and aggregating the first of the plurality of delta frames into the current key frame for $time_0$ to result in an aggregated current key frame for $time_1$.

According to another embodiment of the method, accepting a late joiner viewing client for the screen sharing session and sending the aggregated current key frame to the late joiner viewing client, includes: accepting the late joiner viewing client after $time_1$; sending the late joiner viewing client the aggregated current key frame for $time_1$, in which the aggregated current key frame for $time_1$ defines a current state of the screen of the publishing client in its entirety at time $time_1$; receiving a second of the plurality of delta frames from the publishing client at $time_2$; aggregating the second of the plurality of delta frames into the aggregated current key frame for $time_1$ to result in an aggregated current key frame for $time_2$; storing the aggregated current key frame for $time_2$; and sending the second of the plurality of delta frames from the publishing client at $time_2$ to the one or more viewing clients and to the late joiner viewing client.

According to another embodiment, the method further includes: receiving further ones of the plurality of delta frames from the publishing client at $time_3$ through $time_n$; aggregating each of the further ones of the plurality of delta frames into the aggregated current key frame for $time_3$ through $time_n$ to result in an aggregated current key frame for $time_n$; storing the aggregated current key frame for $time_n$; and sending the further ones of the plurality of delta frames from the publishing client at $time_3$ through $time_n$ to the one or more viewing clients and to the late joiner viewing client.

According to another embodiment of the method, each of the plurality of delta frames from the publishing client represent a subset of the screen of the publishing client corresponding to changes at the screen of the publishing client since a preceding delta frame or since the preceding key frame when the delta frame is the first delta frame of the screen sharing session from the publishing client after the key frame.

According to another embodiment of the method, accepting a late joiner viewing client for the screen sharing session includes: accepting the late joiner viewing client when the late joiner viewing client has missed the key frame at a beginning of the screen sharing session and has further missed one or more delta frames subsequent to the key frame.

According to another embodiment of the method, the server is hosted within a host organization operating remote from the publishing client, remote from the one or more viewing clients, and remote from the late joiner viewing client.

According to another embodiment of the method, the host organization provides screen sharing services as a cloud service over a public Internet to the publishing client, the one or more viewing clients, and the late joiner viewing client.

According to another embodiment, the method further includes: receiving the plurality of delta frames from the publishing client at a receive interface of the server; sequencing the plurality of delta frames from the publishing client according to a frame identifier of each of the plurality of delta frames; and transmitting the plurality of delta frames to the one or more viewing clients in sequence.

According to another embodiment, the method further includes: queuing each of the plurality of delta frames in an outgoing FIFO buffer prior to transmitting the one or more viewing clients; iteratively checking the outgoing FIFO buffer to determine if two or more of the plurality of delta frames remain concurrently queued for transmitting; aggregating the two or more delta frames into a single aggregated delta frame; queuing the aggregated delta frame in the outgoing FIFO buffer with a priority according to its original position in the outgoing FIFO buffer prior to aggregation; and transmitting the aggregated delta frame to the one or more viewing clients.

According to another embodiment, the method further includes: establishing a dedicated server transmitter, frame aggregator, frame sequencer, and FIFO buffer for each of the one or more viewing clients and the late joiner viewing client on a 1:1 basis; sequencing and buffering each of the plurality of delta frames into the respective FIFO buffer for each of the one or more viewing clients and the late joiner viewing client; monitoring each of the respective FIFO buffers for each of the one or more viewing clients and the late joiner viewing client to determine if two or more delta frames are concurrently queued at any given time; aggregating the two or more delta frames into a single aggregated delta frame; queuing the aggregated delta frame in the respective FIFO buffer with a priority according to its original position; and transmitting the aggregated delta frame to the respective viewing client or late joiner viewing client from the corresponding FIFO buffer.

In accordance with the disclosed embodiments, there is another method having operations including: establishing from a host organization a communications interface with a publishing client, the publishing client to share a screen with one or more viewing clients via the host organization; establishing a communications interface with the one or more viewing clients to share the screen from the publishing client; receiving a key frame from the publishing client, the key frame defining the screen of the publishing client in its entirety at $time_0$; transmitting the key frame to the one or more viewing clients; receiving a plurality of delta frames from the publishing client, the plurality of delta frames defining a subset of the screen of the publishing client at $time_1$ through $time_n$; generating an aggregated current key frame at the host organization by updating the key frame with changes specified by the delta frames; sending the plurality of delta frames to the one or more viewing clients to update the screen shared by the publishing client; receiving a new communications interface from a late joiner viewing client, the late joiner viewing client having missed the key frame and one or more of the delta frames; sending the aggregated current key frame to the late joiner viewing client defining the screen of the publishing client in its entirety at $time_n$ according to the key frame and all subsequent delta frames; receiving delta frames from the publishing client after $time_n$; and sending the delta frames after $time_n$ to the one or more viewing clients and to the late joiner viewing client.

In accordance with another embodiment there is non-transitory computer readable storage media having instructions stored thereon that, when executed by a processor in a server, the instructions cause the server to perform operations including: receiving, at a server, a key frame from a publishing client sharing its screen, the key frame defining the screen of the publishing client in its entirety at the beginning of a screen sharing session with one or more viewing clients; transmitting the key frame to the one or more viewing clients; iteratively processing each of a plurality of delta frames from the publishing client specifying changes to the screen of the publishing client, in which the iterative processing includes: (i) receiving each delta frame, (ii) updating an aggregated current key frame with the delta frame received, and (iii) sending the delta frame to the one or more viewing clients; accepting a late joiner viewing client for the screen sharing session; sending the aggregated current key frame to the late joiner viewing client; and sending subsequently received delta frames to the one or more viewing clients and to the late joiner viewing client.

In one embodiment, the non-transitory computer readable storage media has further operations including: storing the key frame from the publishing client sharing its screen at the server as a current key frame for $time_0$ corresponding to the start of the screen sharing session; receiving a first of the plurality of delta frames from the publishing client at $time_1$; and aggregating the first of the plurality of delta frames into the current key frame for $time_0$ to result in an aggregated current key frame for $time_1$.

In another embodiment of the non-transitory computer readable storage media, accepting a late joiner viewing client for the screen sharing session includes: accepting the late joiner viewing client when the late joiner viewing client has missed the key frame at a beginning of the screen sharing session and has further missed one or more delta frames subsequent to the key frame.

Figure 4B:
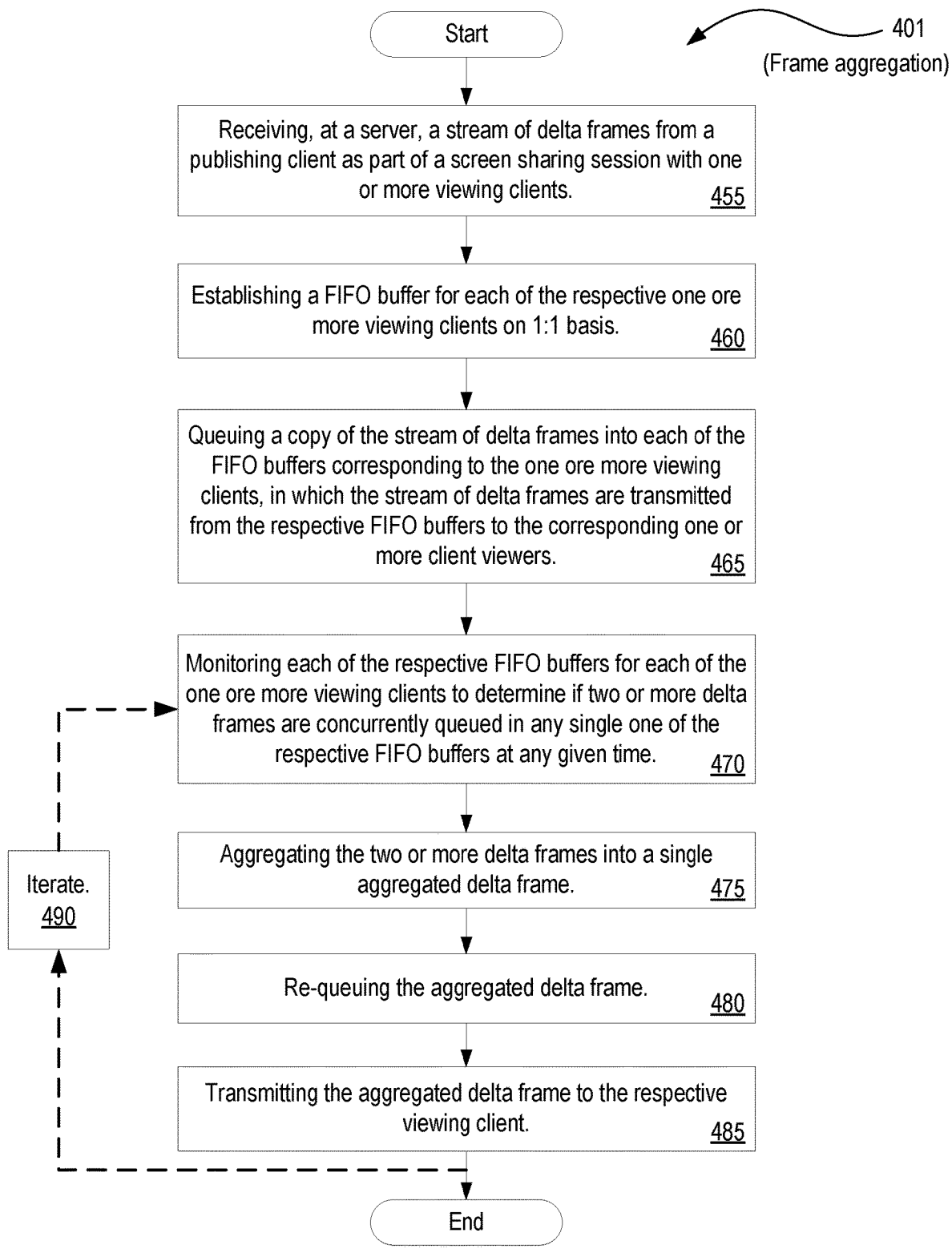
FIG. 4B is a flow diagram illustrating another method in accordance with disclosed embodiments.

FIG. 4B is a flow diagram illustrating another method 401 in accordance with disclosed embodiments. Method 401 may be performed by processing logic that may include hardware (e.g., circuitry, dedicated logic, programmable logic, microcode, etc.), software (e.g., instructions run on a processing device to perform various operations such transmitting, sending, receiving, monitoring, recording, updating, calculating, etc., in pursuance of the systems, apparatuses, and methods for implementing frame aggregation with screen sharing, as described herein. For example, server 120 of FIG. 1B may implement the described methodologies. Some of the blocks and/or operations listed below are optional in accordance with certain embodiments. The numbering of the blocks presented is for the sake of clarity and is not intended to prescribe an order of operations in which the various blocks must occur.

At block 455, processing logic at a server receives a stream of delta frames from a publishing client as part of a screen sharing session with one or more viewing clients.

At block 460, processing logic establishes a FIFO buffer for each of the respective one or more viewing clients on 1:1 basis.

At block 465, processing logic queues a copy of the stream of delta frames into each of the FIFO buffers corresponding to the one or more viewing clients, in which the stream of delta frames are transmitted from the respective FIFO buffers to the corresponding one or more client viewers.

At block 470, processing logic monitors each of the respective FIFO buffers for each of the one or more viewing clients to determine if two or more delta frames are concurrently queued in any single one of the respective FIFO buffers at any given time.

At block 475, processing logic aggregates (e.g., combines, sums, etc.) the two or more delta frames into a single aggregated delta frame.

At block 480, processing logic re-queues the aggregated delta frame. The stream data within the aggregated delta frame is "re-queued" having been pulled out by the frame aggregator and combined, it needs to be placed back into the FIFO queue to be picked up for transmission to the appropriate client viewer.

At block 485, processing logic transmits the aggregated delta frame to the respective viewing client. Processing then ends or iterates as necessary through block 490 by returning to block 470.

Thus, it is in accordance with the disclosed embodiments that a method includes: receiving, at a server, a stream of delta frames from a publishing client as part of a screen sharing session with one or more viewing clients; establishing a FIFO buffer for each of the respective one or more viewing clients on 1:1 basis; queuing a copy of the stream of delta frames into each of the FIFO buffers corresponding to the one or more viewing clients, in which the stream of delta frames are transmitted from the respective FIFO buffers to the corresponding one or more client viewers; monitoring each of the respective FIFO buffers for each of the one or more viewing clients to determine if two or more delta frames are concurrently queued in any single one of the respective FIFO buffers at any given time; aggregating the two or more delta frames into a single aggregated delta frame; re-queuing the aggregated delta frame; and transmitting the aggregated delta frame to the respective viewing client.

In accordance with one embodiment, the method further includes: receiving, at the server, a key frame from the publishing client sharing its screen as a first frame of the stream with the plurality of delta frames following the key frame, in which the key frame defines the screen of the publishing client in its entirety at the beginning of a screen sharing session with the one or more viewing clients.

According to one embodiment of the method, the plurality of delta frames from the publishing client represent a subset of the screen of the publishing client corresponding to changes at the screen of the publishing client since a preceding delta frame or since the preceding key frame when the delta frame is the first delta frame of the screen sharing session from the publishing client after the key frame.

According to one embodiment of the method, each of the plurality of delta frames from the publishing client specifies changes to the screen of the publishing client and includes less than all of the data required to define the screen of the publishing client in its entirety.

According to one embodiment of the method, re-queuing the aggregated delta frame includes queuing the aggregated delta frame in the respective FIFO buffer with a priority according to an original position of the two or more delta frames aggregated.

In accordance with one embodiment, the method further includes: establishing a server transmitter for each of the respective one or more viewing clients on 1:1 basis; and in which each server transmitter is dedicated to transmitting queued delta frames for exactly one of the viewing clients from the corresponding FIFO buffer established for the same viewing client.

According to one embodiment of the method, transmitting the aggregated delta frame to the respective viewing client includes transmitting the aggregated delta frame to the respective viewing client from the corresponding FIFO buffer as the delta frames are queued into the FIFO buffer at the greater of: (a) an unrestricted bandwidth rate at which the delta frames are received into the queue or (b) a restricted bandwidth rate at which each respective viewing client is capable of consuming the delta frames from the server.

According to one embodiment of the method, the two or more delta frames become concurrently queued in the FIFO buffers for one of the viewing clients when the viewing client consumes the stream of delta frames from the server slower than the publishing client sends the stream of delta frames to the server.

According to one embodiment of the method, the publishing client sends the stream of delta frames to the server at a rate greater than one of the viewing clients consumes the stream of delta frames from the server; and aggregating the two or more delta frames into a single aggregated delta frame reduces the quantity of delta frames transmitted to the viewing client and reduces the total payload data transmitted to the viewing client via the stream of delta frames.

According to one embodiment of the method, the server receives the stream of delta frames from the publishing client at a first bandwidth rate; in which a first one of the viewing clients receives the stream of delta frames from the server at a second bandwidth rate lesser than the first bandwidth rate via frame aggregation by the server iteratively combine multiple of the delta frames in the stream into aggregated delta frames on behalf of the first one of the viewing clients; and in which a second one of the viewing clients receives the stream of delta frames from the server at the first bandwidth rate equal to the rate at which the server receives the stream of delta frames from the publishing client, the second one of the viewing clients to receive the stream of delta frames from the server without frame aggregation on the stream of delta frames by the server.

In accordance with one embodiment, the method further includes: sequencing the plurality of delta frames from the publishing client according to a frame identifier of each of the plurality of delta frames; and queuing the plurality of delta frames into the respective FIFO buffers according to their sequencing regardless of the order in which the plurality of delta frames are received at the server.

According to one embodiment of the method, aggregating the two or more delta frames into a single aggregated delta frame includes: identifying two or more sequential and adjacent delta frames concurrently queued in one of the respective FIFO buffers awaiting transmission to corresponding viewing client; retrieving the two or more sequential and adjacent delta frames; aggregating the two or more sequential and adjacent delta frames by overwriting overlapping areas of the publishing client's screen as specified by earlier of the two or more sequential and adjacent delta frames with corresponding overlapping areas as specified by later of the two or more sequential and adjacent delta frames.

In accordance with one embodiment, the method further includes: establishing a communications interface with the publishing client prior to receiving the stream from the publishing client beginning with a key frame followed by the plurality of delta frames; establishing a communications interface with the one or more viewing clients to share the screen from the publishing client prior to receiving the key frame from the publishing client; and transmitting the stream to the one or more viewing clients beginning with the key frame followed by the plurality of delta frames.

In accordance with one embodiment, the method further includes: receiving a first of the plurality of delta frames from the publishing client at $time_1$; receiving a second of the plurality of delta frames from the publishing client at $time_2$; aggregating the first and the second of the plurality of delta frames into the single aggregated delta frame representing all changes at the presenting client's screen from $time_1$ to $time_2$; and transmitting the single aggregated delta frame for $time_1$ to $time_2$ to one of the client viewers.

According to one embodiment of the method, the server is hosted within a host organization operating remote from the publishing client and remote from the one or more viewing clients.

According to one embodiment of the method, the host organization provides screen sharing services as a cloud service over a public Internet to the publishing client and to the one or more viewing clients.

In accordance with one embodiment there is a non-transitory computer readable storage media having instructions stored thereon that, when executed by a processor in a server, the instructions cause the server to perform operations including: receiving, at a server, a stream of delta frames from a publishing client as part of a screen sharing session with one or more viewing clients; establishing a FIFO buffer for each of the respective one or more viewing clients on 1:1 basis; queuing a copy of the stream of delta frames into each of the FIFO buffers corresponding to the one or more viewing clients, in which the stream of delta frames are transmitted from the respective FIFO buffers to the corresponding one or more client viewers; monitoring each of the respective FIFO buffers for each of the one or more viewing clients to determine if two or more delta frames are concurrently queued in any single one of the respective FIFO buffers at any given time; aggregating the two or more delta frames into a single aggregated delta frame; re-queuing the aggregated delta frame; and transmitting the aggregated delta frame to the respective viewing client.

According to one embodiment of the non-transitory computer readable storage media, operations further include: receiving a first of the plurality of delta frames from the publishing client at $time_1$; receiving a second of the plurality of delta frames from the publishing client at $time_2$; aggregating the first and the second of the plurality of delta frames into the single aggregated delta frame representing all changes at the presenting client's screen from $time_1$ to $time_2$; and transmitting the single aggregated delta frame for $time_1$ to $time_2$ to one of the client viewers.

According to another embodiment of the non-transitory computer readable storage media, the publishing client sends the stream of delta frames to the server at a rate greater than one of the viewing clients consumes the stream of delta frames from the server; and in which aggregating the two or more delta frames into a single aggregated delta frame reduces the quantity of delta frames transmitted to the viewing client and reduces the total payload data transmitted to the viewing client via the stream of delta frames.

FIG. 5 illustrates a diagrammatic representation of a machine 500 in the exemplary form of a computer system, in accordance with one embodiment, within which a set of instructions, for causing the machine/computer system 500 to perform any one or more of the methodologies discussed herein, may be executed. In alternative embodiments, the machine may be connected (e.g., networked) to other machines in a Local Area Network (LAN), an intranet, an extranet, or the public Internet. The machine may operate in the capacity of a server or a client machine in a client-server network environment, as a peer machine in a peer-to-peer (or distributed) network environment, as a server or series of servers within an on-demand service environment. Certain embodiments of the machine may be in the form of a personal computer (PC), a tablet PC, a set-top box (STB), a Personal Digital Assistant (PDA), a cellular telephone, a web appliance, a server, a network router, switch or bridge, computing system, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 500 includes a processor 502, a main memory 504 (e.g., read-only memory (ROM), flash memory, dynamic random access memory (DRAM) such as synchronous DRAM (SDRAM) or Rambus DRAM (RDRAM), etc., static memory such as flash memory, static random access memory (SRAM), volatile but high-data rate RAM, etc.), and a secondary memory 518 (e.g., a persistent storage device including hard disk drives and a persistent database and/or a multi-tenant database implementation), which communicate with each other via a bus 530. Main memory 504 includes the SLC library 524, a viewer module 523, and a publisher module 525. Main memory 504 and its sub-elements are operable in conjunction with processing logic 526 and processor 502 to perform the methodologies discussed herein. The computer system 500 may additionally or alternatively embody the server side elements as described above.

Processor 502 represents one or more general-purpose processing devices such as a microprocessor, central processing unit, or the like. More particularly, the processor 502 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processor 502 may also be one or more special-purpose processing devices such as an application specific integrated circuit (ASIC), a field programmable gate array (FPGA), a digital signal processor (DSP), network processor, or the like. Processor 502 is configured to execute the processing logic 526 for performing the operations and functionality which is discussed herein.

The computer system 500 may further include a network interface card 508. The computer system 500 also may include a user interface 510 (such as a video display unit, a liquid crystal display (LCD), or a cathode ray tube (CRT)), an alphanumeric input device 512 (e.g., a keyboard), a cursor control device 514 (e.g., a mouse), and a signal generation device 516 (e.g., an integrated speaker). The computer system 500 may further include peripheral device 536 (e.g., wireless or wired communication devices, memory devices, storage devices, audio processing devices, video processing devices, etc.).

The secondary memory 518 may include a non-transitory machine-readable or computer readable storage medium 531 on which is stored one or more sets of instructions (e.g., software 522) embodying any one or more of the methodologies or functions described herein. The software 522 may also reside, completely or at least partially, within the main memory 504 and/or within the processor 502 during execution thereof by the computer system 500, the main memory 504 and the processor 502 also constituting machine-readable storage media. The software 522 may further be transmitted or received over a network 520 via the network interface card 508.

Figure 6:
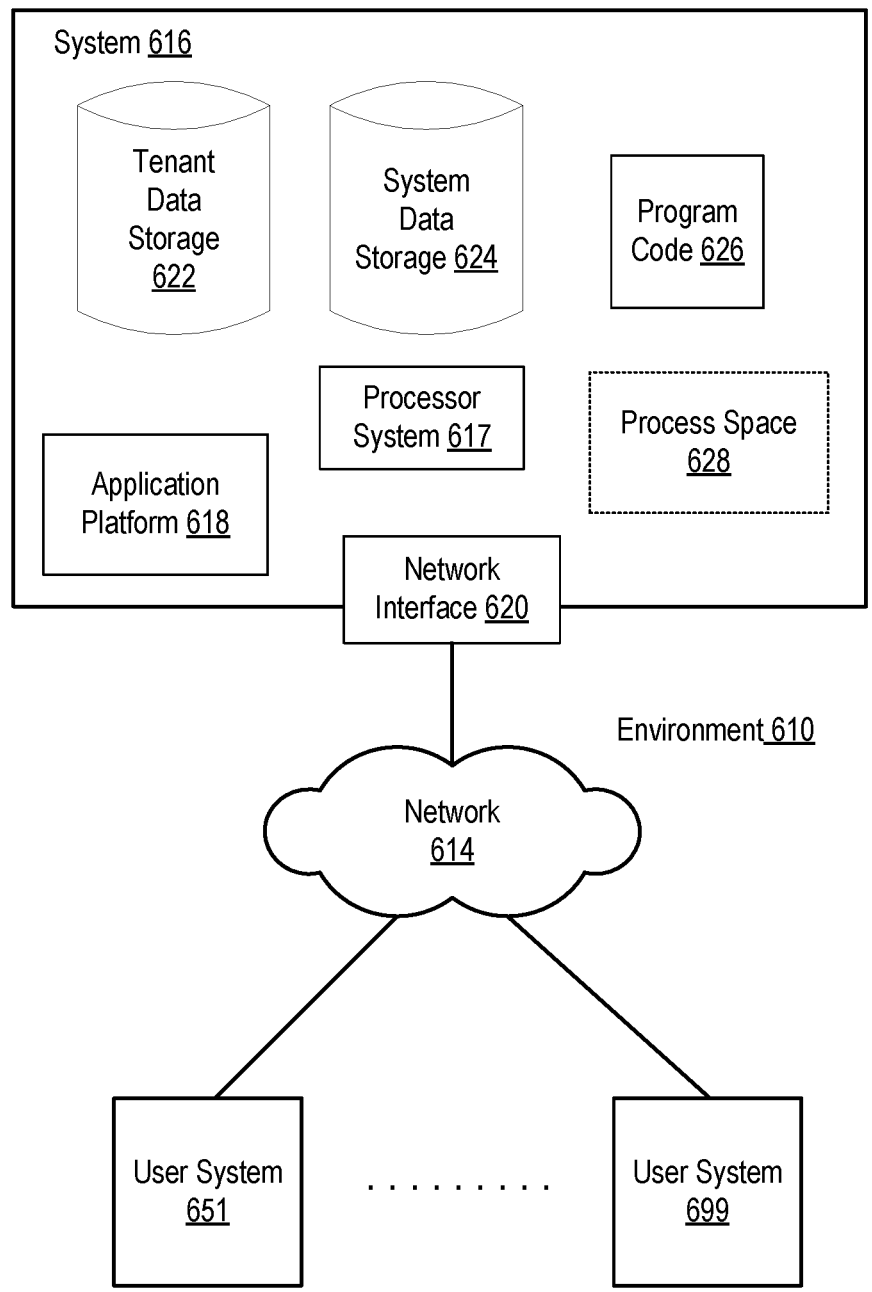
FIG. 6 illustrates a block diagram of an example of an environment in which an on-demand database service might be used.

FIG. 6 illustrates a block diagram of an example of an environment 610 in which an on-demand database service might be used. Environment 610 may include user systems 651 through 699, network 614, system 616, processor system 617, application platform 618, network interface 620, tenant data storage 622, system data storage 624, program code 626, and process space 628. In other embodiments, environment 610 may not have all of the components listed and/or may have other elements instead of, or in addition to, those listed above.

Environment 610 is an environment in which an on-demand database service exists. User systems 651 through 699 may be any machine or system that is used by a user to access a database user system. For example, any of user systems 651 through 699 can be a handheld computing device, a mobile phone, a laptop computer, a work station, and/or a network of computing devices. As illustrated in FIG. 6 (and in more detail in FIG. 7) user systems 651 through 699 might interact via a network 614 with an on-demand database service, which is system 616.

An on-demand database service, such as system 616, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, "on-demand database service 616" and "system 616" is used interchangeably herein. A database image may include one or more database objects. A relational database management system (RDMS) or the equivalent may execute storage and retrieval of information against the database object(s). Application platform 618 may be a framework that allows the applications of system 616 to run, such as the hardware and/or software, e.g., the operating system. In an embodiment, on-demand database service 616 may include an application platform 618 that enables creation, managing and executing one or more applications developed by the provider of the on-demand database service, users accessing the on-demand database service via user systems 651 through 699, or third party application developers accessing the on-demand database service via user systems 651 through 699.

The users of user systems 651 through 699 may differ in their respective capacities, and the capacity of a particular user system (e.g., 651 through 699) might be entirely determined by permissions (permission levels) for the current user. For example, where a salesperson is using a particular user system (e.g., 651 through 699) to interact with system 616, that user system has the capacities allotted to that salesperson. However, while an administrator is using that user system to interact with system 616, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 614 is any network or combination of networks of devices that communicate with one another. For example, network 614 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it is understood that the networks that the claimed embodiments may utilize are not so limited, although TCP/IP is a frequently implemented protocol.

User systems 651 through 699 might communicate with system 616 using TCP/IP and, at a higher network level, use other common Internet protocols to communicate, such as HTTP, FTP, AFS, WAP, etc. In an example where HTTP is used, user system (e.g., 651 through 699) might include an HTTP client commonly referred to as a "browser" for sending and receiving HTTP messages to and from an HTTP server at system 616. Such an HTTP server might be implemented as the sole network interface between system 616 and network 614, but other techniques might be used as well or instead. In some implementations, the interface between system 616 and network 614 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 616, shown in FIG. 6, implements a web-based customer relationship management (CRM) system. For example, in one embodiment, system 616 includes application servers configured to implement and execute CRM software applications as well as provide related data, code, forms, webpages and other information to and from user systems 651 through 699 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 616 implements applications other than, or in addition to, a CRM application. For example, system 616 may provide tenant access to multiple hosted (standard and custom) applications, including a CRM application. User (or third party developer) applications, which may or may not include CRM, may be supported by the application platform 618, which manages creation, storage of the applications into one or more database objects and executing of the applications in a virtual machine in the process space of the system 616.

One arrangement for elements of system 616 is shown in FIG. 6, including a network interface 620, application platform 618, tenant data storage 622 for tenant data 623, system data storage 624 for system data 625 accessible to system 616 and possibly multiple tenants, program code 626 for implementing various functions of system 616, and a process space 628 for executing MTS system processes and tenant-specific processes, such as running applications as part of an application hosting service. Additional processes that may execute on system 616 include database indexing processes.

Several elements in the system shown in FIG. 6 include conventional, well-known elements that are explained only briefly here. For example, each user system (e.g., 651 through 699) may include a desktop personal computer, workstation, laptop, PDA, cell phone, or any wireless access protocol (WAP) enabled device or any other computing device capable of interfacing directly or indirectly to the Internet or other network connection. User system (e.g., 651 through 699) typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system (e.g., 651 through 699) to access, process and view information, pages and applications available to it from system 616 over network 614. Each user system (e.g., 651 through 699) also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by system 616 or other systems or servers. For example, the user interface device can be used to access data and applications hosted by system 616, and to perform searches on stored data, and otherwise allow a user to interact with various GUI pages that may be presented to a user. As discussed above, embodiments are suitable for use with the Internet, which refers to a specific global internetwork of networks. However, it is understood that other networks can be used instead of the Internet, such as an intranet, an extranet, a virtual private network (VPN), a non-TCP/IP based network, any LAN or WAN or the like.

According to one embodiment, each user system (e.g., 651 through 699) and all of its components are operator configurable using applications, such as a browser, including computer code run using a central processing unit such as an Intel Pentium® processor or the like. Similarly, system 616 (and additional instances of an MTS, where more than one is present) and all of their components might be operator configurable using application(s) including computer code to run using a central processing unit such as processor system 617, which may include an Intel Pentium® processor or the like, and/or multiple processor units.

According to one embodiment, each system 616 is configured to provide webpages, forms, applications, data and media content to user (client) system (e.g., 651 through 699) to support the access by user systems 651 through 699 as tenants of system 616. As such, system 616 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS may include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It is understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

Figure 7:
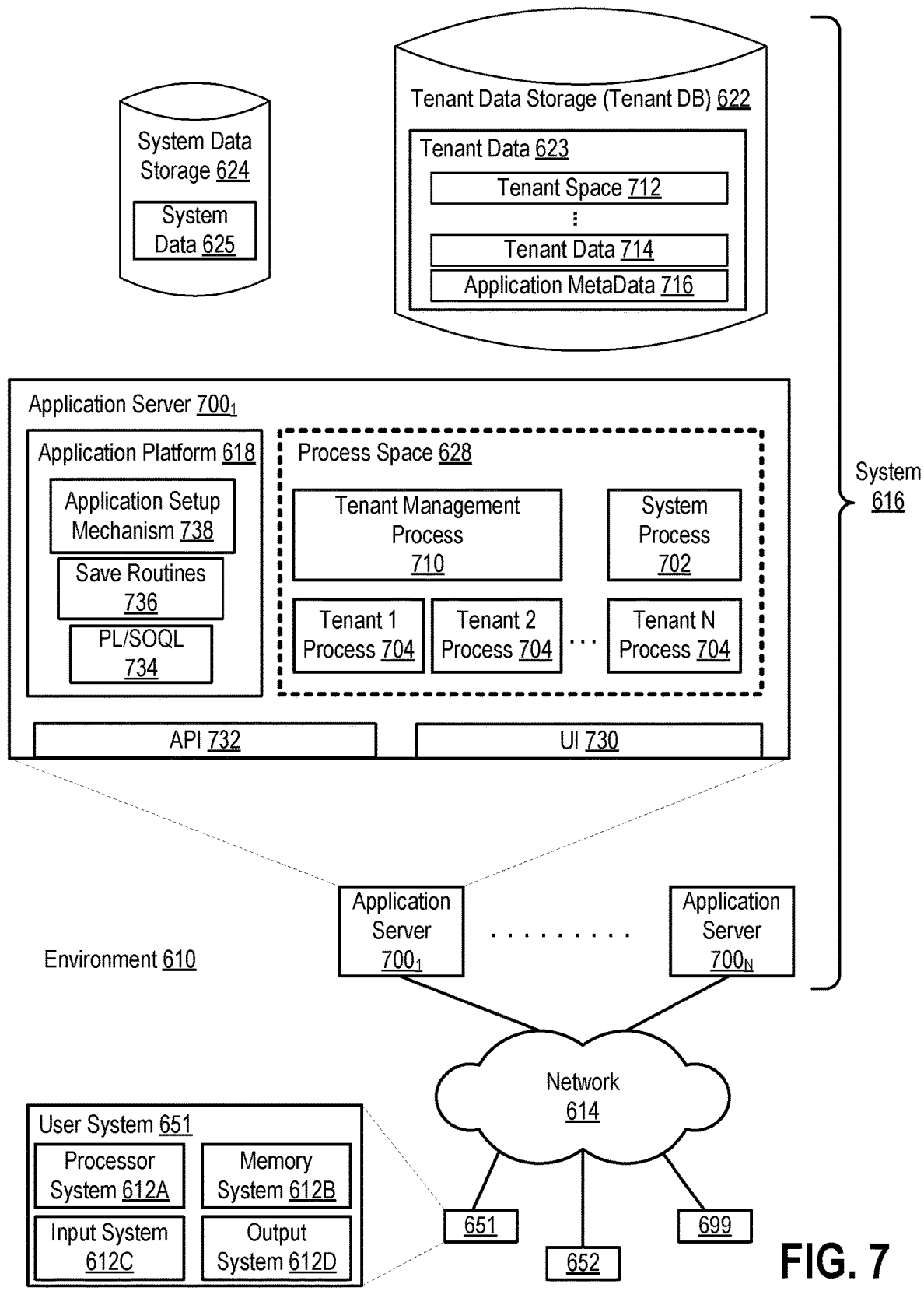
FIG. 7 illustrates a block diagram of an embodiment of elements of FIG. 6 and various possible interconnections between these elements.

FIG. 7 illustrates a block diagram of an embodiment of elements of FIG. 6 and various possible interconnections between these elements. FIG. 7 also illustrates environment 610. However, in FIG. 7, the elements of system 616 and various interconnections in an embodiment are further illustrated. FIG. 7 shows that user system 651 may include a processor system 612A, memory system 612B, input system 612C, and output system 612D. FIG. 7 shows network 614 and system 616. FIG. 7 also shows that system 616 may include tenant data storage 622, tenant data 623, system data storage 624, system data 625, User Interface (UI) 730, Application Program Interface (API) 732, PL/SOQL 734, save routines 736, application setup mechanism 738, applications servers $700_1$-$700_N$, system process space 702, tenant process spaces 704, tenant management process space 710, tenant storage area 712, tenant data 714, and application metadata 716. In other embodiments, environment 610 may not have the same elements as those listed above and/or may have other elements instead of, or in addition to, those listed above.

User system 651, network 614, system 616, tenant data storage 622, and system data storage 624 were discussed above in FIG. 6. As shown by FIG. 7, system 616 may include a network interface 620 (of FIG. 6) implemented as a set of HTTP application servers 700, an application platform 618, tenant data storage 622, and system data storage 624. Also shown is system process space 702, including individual tenant process spaces 704 and a tenant management process space 710. Each application server 700 may be configured to tenant data storage 622 and the tenant data 623 therein, and system data storage 624 and the system data 625 therein to serve requests of user systems 651 through 699 (e.g., elements 651, 652, and 699 shown here). The tenant data 623 might be divided into individual tenant storage areas 712, which can be either a physical arrangement and/or a logical arrangement of data. Within each tenant storage area 712, tenant data 714 and application metadata 716 might be similarly allocated for each user. For example, a copy of a user's most recently used (MRU) items might be stored to tenant data 714. Similarly, a copy of MRU items for an entire organization that is a tenant might be stored to tenant storage area 712. A UI 730 provides a user interface and an API 732 provides an application programmer interface to system 616 resident processes to users and/or developers at user systems 651 through 699. The tenant data and the system data may be stored in various databases, such as one or more Oracle™ databases.

Application platform 618 includes an application setup mechanism 738 that supports application developers' creation and management of applications, which may be saved as metadata into tenant data storage 622 by save routines 736 for execution by subscribers as one or more tenant process spaces 704 managed by tenant management process space 710 for example. Invocations to such applications may be coded using PL/SOQL 734 that provides a programming language style interface extension to API 732. Invocations to applications may be detected by one or more system processes, which manages retrieving application metadata 716 for the subscriber making the invocation and executing the metadata as an application in a virtual machine.

Each application server 700 may be communicably coupled to database systems, e.g., having access to system data 625 and tenant data 623, via a different network connection. For example, one application server $700_1$ might be coupled via the network 614 (e.g., the Internet), another application server $700_{N-1}$ might be coupled via a direct network link, and another application server $700_N$ might be coupled by yet a different network connection. Transfer Control Protocol and Internet Protocol (TCP/IP) are typical protocols for communicating between application servers 700 and the database system. However, it will be apparent to one skilled in the art that other transport protocols may be used to optimize the system depending on the network interconnect used.

In certain embodiments, each application server 700 is configured to handle requests for any user associated with any organization that is a tenant. Because it is desirable to be able to add and remove application servers from the server pool at any time for any reason, there is preferably no server affinity for a user and/or organization to a specific application server 700. In one embodiment, therefore, an interface system implementing a load balancing function (e.g., an F5 Big-IP load balancer) is communicably coupled between the application servers 700 and the user systems 651 through 699 to distribute requests to the application servers 700. In one embodiment, the load balancer uses a least connections algorithm to route user requests to the application servers 700. Other examples of load balancing algorithms, such as round robin and observed response time, also can be used. For example, in certain embodiments, three consecutive requests from the same user may hit three different application servers 700, and three requests from different users may hit the same application server 700. In this manner, system 616 is multi-tenant, in which system 616 handles storage of, and access to, different objects, data and applications across disparate users and organizations.

As an example of storage, one tenant might be a company that employs a sales force where each salesperson uses system 616 to manage their sales process. Thus, a user might maintain contact data, leads data, customer follow-up data, performance data, goals and progress data, etc., all applicable to that user's personal sales process (e.g., in tenant data storage 622). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 616 that are allocated at the tenant level while other data structures might be managed at the user level. Because an MTS might support multiple tenants including possible competitors, the MTS may have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, system 616 might also maintain system level data usable by multiple tenants or other data. Such system level data might include industry reports, news, postings, and the like that are sharable among tenants.

In certain embodiments, user systems 651 through 699 (which may be client systems) communicate with application servers 700 to request and update system-level and tenant-level data from system 616 that may require sending one or more queries to tenant data storage 622 and/or system data storage 624. System 616 (e.g., an application server 700 in system 616) automatically generates one or more SQL statements (e.g., one or more SQL queries) that are designed to access the desired information. System data storage 624 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects as described herein. It is understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It is understood that the word "entity" may also be used interchangeably herein with "object" and "table."

In some multi-tenant database systems, tenants may be allowed to create and store custom objects, or they may be allowed to customize standard entities or objects, for example by creating custom fields for standard objects, including custom index fields. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

While the subject matter disclosed herein has been described by way of example and in terms of the specific embodiments, it is to be understood that the claimed embodiments are not limited to the explicitly enumerated embodiments disclosed. To the contrary, the disclosure is intended to cover various modifications and similar arrangements as are apparent to those skilled in the art. Therefore, the scope of the appended claims are to be accorded the broadest interpretation so as to encompass all such modifications and similar arrangements. It is to be understood that the above description is intended to be illustrative, and not restrictive. Many other embodiments will be apparent to those of skill in the art upon reading and understanding the above description. The scope of the disclosed subject matter is therefore to be determined in reference to the appended claims, along with the full scope of equivalents to which such claims are entitled.

What is claimed is:

1. A method comprising:
   receiving, at a server, a stream of delta frames from a publishing client as part of a screen sharing session with one or more viewing clients;
   establishing a FIFO buffer for each of the respective one or more viewing clients on 1:1 basis;
   queuing a copy of the stream of delta frames into each of the FIFO buffers corresponding to the respective one or more viewing clients, wherein the respective copy of the stream of delta frames are transmitted from the respective FIFO buffers to the corresponding one or more viewing clients;
   monitoring each of the respective FIFO buffers for each of the respective one or more viewing clients to determine if two or more delta frames are concurrently queued in any single one of the respective FIFO buffers at any given time;
   aggregating the two or more delta frames into a single aggregated delta frame;
   re-queuing the single aggregated delta frame; and
   transmitting the single aggregated delta frame to the respective one or more viewing clients.

2. The method of claim 1, further comprising:
   receiving, at the server, a key frame from the publishing client sharing its screen as a first frame of the stream with the plurality of delta frames following the key frame, wherein the key frame defines a screen of the publishing client in its entirety at the beginning of the screen sharing session with the respective one or more viewing clients.

3. The method of claim 2, wherein each of the plurality of delta frames from the publishing client represent a subset of the screen of the publishing client corresponding to changes at the screen of the publishing client since a preceding delta frame or since a preceding key frame when the delta frame is a first delta frame of the screen sharing session from the publishing client after the key frame.

4. The method of claim 1, wherein each of the plurality of delta frames from the publishing client specifies changes to a screen of the publishing client and includes less than all data required to define the screen of the publishing client in its entirety.

5. The method of claim 1, wherein re-queuing the single aggregated delta frame comprises queuing the single aggregated delta frame in the respective FIFO buffer with a priority according to an original position of the two or more delta frames aggregated.

6. The method of claim 1, further comprising:
   establishing a server transmitter for each of the respective one or more viewing clients on 1:1 basis; and
   wherein each of the respective server transmitter is dedicated to transmitting queued delta frames for exactly one of the viewing clients from the corresponding FIFO buffer established for the same viewing client.

7. The method of claim 6, wherein transmitting the single aggregated delta frame to the respective viewing client comprises transmitting the single aggregated delta frame to the respective viewing client from the corresponding FIFO buffer as the delta frames are queued into the FIFO buffer at the greater of: (a) an unrestricted bandwidth rate at which the delta frames are received into the queue or (b) a restricted bandwidth rate at which each respective viewing client is capable of consuming the delta frames from the server.

8. The method of claim 1, wherein the two or more delta frames become concurrently queued in the FIFO buffers for one of the viewing clients when the viewing client consumes the stream of delta frames from the server slower than the publishing client sends the stream of delta frames to the server.

9. The method of claim 1:
wherein the publishing client sends the stream of delta frames to the server at a rate greater than one of the viewing clients consumes the stream of delta frames from the server; and
wherein aggregating the two or more delta frames into the single aggregated delta frame reduces a quantity of delta frames transmitted to the viewing client and reduces a total payload data transmitted to the viewing client via the stream of delta frames.

10. The method of claim 1:
wherein the server receives the stream of delta frames from the publishing client at a first bandwidth rate;
wherein a first one of the viewing clients receives the stream of delta frames from the server at a second bandwidth rate lesser than the first bandwidth rate via frame aggregation by the server iteratively combine multiple of the delta frames in the stream into aggregated delta frames on behalf of the first one of the viewing clients; and
wherein a second one of the viewing clients receives the stream of delta frames from the server at the first bandwidth rate equal to the rate at which the server receives the stream of delta frames from the publishing client, the second one of the viewing clients to receive the stream of delta frames from the server without frame aggregation on the stream of delta frames by the server.

11. A method performed by a publishing client device, wherein the method comprises:
preparing delta frames for transmission to a server within a stream of delta frames from the publishing client device as part of a screen sharing session with one or more viewing clients communicably interfaced with the server;
wherein the server establishes a FIFO buffer for each of the respective one or more viewing clients on 1:1 basis to receive the stream of delta frames from the publishing client device;
packaging the delta frames into media object containers by adding the delta frames as payload to the media object containers;
sequencing the media object containers by tagging each of the media object containers with an assigned sequence number;
transmitting, via a client transmitter of the publishing client device, the media object containers having the delta frames therein to the server within the stream of delta frames;
wherein the server receives the media object containers having the delta frames therein in an order different than an original order as transmitted via the client transmitter; and
wherein a sequencer of the server sequences the delta frames into the original order as transmitted via the client transmitter based on the assigned sequence number tagged to each of the media object containers by the publishing client device.

12. The method of claim 11, wherein the server transmits the stream of delta frames to the respective one or more viewing clients from the FIFO buffer established for each of the respective one or more viewing clients.

13. The method of claim 11, further comprising:
placing the media object containers into an output queue of the publishing client device; and
wherein transmitting the media object containers having the delta frames therein to the server within the stream of delta frames comprises transmitting the media object containers to the server from the output queue of the publishing client device.

14. The method of claim 13, further comprising:
periodically checking the output queue of the publishing client device to determine if there are multiple delta frames in the output queue;
aggregating the multiple delta frames into a single aggregated delta frame; and
substituting the multiple delta frames with the single aggregated delta frame within the output queue of the publishing client device.

15. The method of claim 11, wherein the server is operated by a host organization providing on-demand cloud computing services to subscribers of the host organization.

16. The method of claim 15:
wherein the server is one of a plurality of slipstream media servers operated by the host organization;
wherein the host organization facilitates the exchange of information between the publishing client device and the one or more viewing clients as part of a cloud service; and
wherein the cloud service provided by the host organization negates the need for the subscribers of the host organization to install and maintain server-side software locally.

17. The method of claim 11:
wherein sequencing the media object containers by tagging each of the media object containers with the assigned sequence number provides lossless sequencing for lossless transmission of the stream of delta frames from the publishing client device via one or more TCP/IP transmissions.

18. The method of claim 11:
wherein the server monitors each of the respective FIFO buffers for each of the respective one or more viewing clients to determine if two or more delta frames are concurrently queued in any single one of the respective FIFO buffers;
wherein the server aggregates the two or more delta frames into a single aggregated delta frame;
wherein the server re-queues the single aggregated delta frame; and
wherein the server transmits the single aggregated delta frame to the respective one or more viewing clients.

19. The method of claim 11:
wherein the server triggers a re-transmission request to the publishing client device for any of the delta frames delayed for a period of time exceeding a threshold.

20. Non-transitory computer readable storage media having instructions stored thereupon that, when executed by a processor of a publishing client device, the instructions cause the publishing client device to perform operations including:

preparing delta frames for transmission to a server within a stream of delta frames from the publishing client device as part of a screen sharing session with one or more viewing clients communicably interfaced with the server;

wherein the server establishes a FIFO buffer for each of the respective one or more viewing clients on 1:1 basis to receive the stream of delta frames from the publishing client device;

packaging the delta frames into media object containers by adding the delta frames as payload to the media object containers;

sequencing the media object containers by tagging each of the media object containers with an assigned sequence number;

transmitting, via a client transmitter of the publishing client device, the media object containers having the delta frames therein to the server within the stream of delta frames;

wherein the server receives the media object containers having the delta frames therein in an order different than an original order as transmitted via the client transmitter; and wherein a sequencer of the server sequences the delta frames into the original order as transmitted via the client transmitter based on the assigned sequence number tagged to each of the media object containers by the publishing client device.

21. The non-transitory computer readable storage media of claim 20, wherein the server transmits the stream of delta frames to the respective one or more viewing clients from the FIFO buffer established for each of the respective one or more viewing clients.

* * * * *